US007016968B2

(12) United States Patent
Willner et al.

(10) Patent No.: US 7,016,968 B2
(45) Date of Patent: Mar. 21, 2006

(54) METHOD AND APPARATUS FOR FACILITATING THE PROVIDING OF CONTENT

(75) Inventors: Barry E. Willner, Briarcliff Manor, NY (US); Philip Shi-lung Yu, Chappaqua, NY (US); David P. Greene, Ossining, NY (US); Edith H. Stern, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 09/888,181

(22) Filed: Jun. 22, 2001

(65) Prior Publication Data

US 2002/0199009 A1 Dec. 26, 2002

(51) Int. Cl.
*G06F 15/16* (2006.01)

(52) U.S. Cl. ...................... 709/231; 709/202; 709/217; 709/227

(58) Field of Classification Search ........ 709/201–203, 709/227–228, 231–234, 217–219
See application file for complete search history.

(56) References Cited

U.S. PATENT DOCUMENTS

| 6,223,210 | B1 * | 4/2001 | Hickey ...................... 709/203 |
| 6,640,145 | B1 * | 10/2003 | Hoffberg et al. ............ 709/202 |
| 6,807,641 | B1 * | 10/2004 | Ishiguro et al. ................ 714/6 |
| 6,880,171 | B1 * | 4/2005 | Ahmad et al. .............. 725/134 |
| 6,886,029 | B1 * | 4/2005 | Pecus et al. ................ 709/231 |
| 6,886,098 | B1 * | 4/2005 | Benaloh ..................... 713/193 |
| 6,889,207 | B1 * | 5/2005 | Slemmer et al. ............ 709/231 |
| 6,904,264 | B1 * | 6/2005 | Frantz ........................ 709/217 |

* cited by examiner

*Primary Examiner*—Bharat Barot
(74) *Attorney, Agent, or Firm*—Buckley, Maschoff & Talwalkar LLC; Stephen C. Kaufman

(57) ABSTRACT

A system, method, apparatus, and computer program code for providing content to a device, wherein operation of the device may be interrupted as a result of a display of content by the device. According to embodiments of the present invention, a plurality of content segments can be identified or selected. In addition, a device (e.g., computer, cellular telephone, personal digital assistant) associated with a recipient of the content segments can be identified or selected. The content segments can then be provided to the device in such a way that display of a content segment by the device may interrupt operation of the device, thereby providing focus on the content segment.

42 Claims, 12 Drawing Sheets

| SOFTWARE IDENTIFER 702 | SOFTWARE DESCRIPTION 704 | SOFTWARE PROVIDER 706 |
|---|---|---|
| S-22654 | SPREADSHEET PROGRAM | SPREADSHEETS ARE US SOFTWARE |
| S-41099 | WORD PROCESSING PROGRAM | WORDSMITH TECHNOLOGIES, INC. |
| S-57654 | ACCOUNTING PROGRAM | BEANCOUNTER DATA SYSTEMS |
| S-88310 | INVENTORY MANAGEMENT PROGRAM | LOTSOFSTUFF.COM |

FIG. 12

METHOD AND APPARATUS FOR FACILITATING THE PROVIDING OF CONTENT

CROSS-REFERENCE TO RELATED PATENT APPLICATION

This patent application is related to co-pending U.S. patent application entitled Method and Apparatus for Facilitating Display of an Advertisement with Software, which has application Ser. No. 09/887,817 and was filed on Jun. 22, 2001 still pending, all of which is incorporated herein by reference.

FIELD OF THE INVENTION

The present invention relates to a method and apparatus for providing content and, more particularly, embodiments of the present invention relate to methods, apparatus, and computer program code for providing multiple content segments to one or more devices associated with a recipient.

BACKGROUND OF THE INVENTION

One way to learn information or master a skill is by repetition of facts, tasks, etc. over time. For example, a child learning multiplication tables may benefit by periodically being asked to complete a multiplication problem and by being given other opportunities to practice or repeat what he or she has learned. Learning or practice of other information and skills (e.g., the translation of foreign language words, geographic or historical facts) can be taught and practiced in a similar manner. Unfortunately, while software programs may exist that are dedicated to teaching specific topics, each such software program is directed to a specific topic and does not provide the opportunity for repeated displays of topic content in conjunction with other software or activities. Further, such software programs do not work in conjunction with other software to provide interruptions of the other software while information is being conveyed.

In other situations, a person periodically may want to receive information or other content via one or more devices. Such content may be educational and related to facts or other information that the person is trying to learn or skills that the person is trying to master. However, prior art systems do not provide a way for the information or other content to be displayed to a person or by a device such that operation of the device or software operating on the device is interrupted while the content is being displayed by the device.

It would be advantageous to provide a method and apparatus that overcame the drawbacks of the prior art. In particular, it would be desirable to provide a method and apparatus that allows a device to display one or more content segments in a manner that operation of the device or software operating on the device is suspended, delayed or otherwise interrupted during display of the content by the device.

SUMMARY OF THE INVENTION

Embodiments of the present invention provide a system, method, apparatus, and computer program code for facilitating the delivery or other providing of content. According to embodiments of the present invention, a plurality of content segments can be identified or selected. In addition, one or more devices (e.g., computer, cellular telephone, personal digital assistant) associated with a recipient of the content segments can be identified or selected. The content segments can then be provided to one or more of the devices in such a way that display of a content segment by a device may interrupt operation of the device, thereby providing focus on the content segment on behalf of a viewer of the content.

A content segment may be or include many things such as, for example, educational content, an advertisement, survey, image, multimedia file, sound or audio file, video file, rich media file, text or other information, etc. A display of a content segment by a device may include an audio component and/or a visual component. Thus, in some embodiments, a device may display a content segment by visually displaying the content segment on a screen. In other embodiments, a device may display a content segment by playing a music, voice or other sound segment or file. In some embodiments, two or more content segments provided to device and/or displayed by a device may be thematically related. For example, two or more of the content segments may be related to the same subject such as, world geography, botany, basketball, astronomy, scuba diving, Civil War history, etc.

An interruption in operation of a device during display of a content segment by the device may include a delay in operation of a software program operating on the device while the content segment is displayed by the device; a delay in transmission, storage or visual display of data by the device; a temporary prevention of use of at least one feature of a device or software operating on the device while the content segment is displayed by the device; etc. By interrupting operation of a device during display by the device of a content segment, a person using the device can focus on the content segment being displayed or can otherwise be encouraged to focus on the content segment.

Additional objects, advantages, and novel features of the invention shall be set forth in part in the description that follows, and in part will become apparent to those skilled in the art upon examination of the following or may be learned by the practice of the invention.

According to embodiments of the present invention, a method for providing content includes determining a plurality of content segments; determining a device associated with a recipient of the content segments; and providing the a first of the content segments to the device at a first time and a second of the content segments to the device at a second time, wherein display of a content segment by the device may interrupt operation of the device and/or software operating on the device. In another embodiment, a method for providing content includes determining a plurality of content segments; determining a first device associated with a recipient of the content segments and a second device associated with the recipient; allowing the first device to display a first of the content segments; and allowing a second device to display a second of the content segments. In a further embodiment, a method for providing content with a portion of software includes determining a plurality of content segments; determining a device associated with a recipient of the content segments; providing at least two of the content segments to the device; and allowing the device to display a first of the content segments at a first time and a second of the content segments at a second time, wherein display of a content segment by the device may interrupt operation of the device of software operating on the device. In another embodiment, a method for providing content with a portion of software includes determining a portion of software; determining a plurality of content segments; establishing a relationship between the portion of software and the content segments such that a first of the content segments may be displayed by a device at a first time when the portion of software is operating on the device and such that an interruption of use of the portion of software on the device, the device, or some other software operating on the device will occur when the first content segment is displayed by the device; and establishing a relationship between the portion of software and the content segments such that a second of the content segments may be displayed by the device at a second time when the portion of software is operating on the device and such that an interruption of use of the portion of software on the device, the device, and/or some other software operating on the device will occur when the second of the content segments is displayed by the device. In a further embodiment, a method for providing content segments with a portion of software includes bundling a portion of software and a plurality of content segments such that the plurality of content segments may be displayed by a device when the portion of software is operated with the device and such that an interruption of operation of the portion of software on the device, the device, or some other software operating on the device will occur during display of a content segment; and providing a bundled arrangement of the portion of software and the content segments.

According to one embodiment of the present invention, a system for facilitating display of at least one content segment includes a memory; a communication port; and a processor connected to the memory and the communication port, the processor being operative to determine a plurality of content segments; determine a device associated with a recipient of the content segments; and provide a first content segment to the device at a first time and a second content segment to the device at a second time, wherein display of a content segment by the device may interrupt operation of the device or software operating on the device. In another embodiment, the processor may be operative to determine a plurality of content segments; determine a first device associated with a recipient of the content segments and a second device associated with the recipient; allow the first device to display a first of the content segments; and allow a second device to display a second of the content segments. In a further embodiment, the processor may be operative to determine a plurality of content segments; determine a device associated with a recipient of the content segments; providing at least two of the content segments to the device; and allow the device to display a first of the content segments at a first time and a second of the content segments at a second time, wherein display of a content segment by the device may interrupt operation of the device or software operating on the device. In another embodiment, the processor may be operative to determine a portion of software; determine a plurality of content segments; establish a relationship between the portion of software and the content segments such that a first of the content segments may be displayed by a device at a first time when the portion of software is operating on the device and such that an interruption of use of the portion of software on the device, the device, or some other software operating on the device will occur when the first content segment is displayed by the device; and establish a relationship between the portion of software and the content segments such that a second of the content segments may be displayed by the device at a second time when the portion of software is operating on the device and such that an interruption of use of the portion of software on the device, the device, or some other software operating on the device will occur when the second of the content segments is displayed by the device. In a further embodiment, the processor may be operative to bundle a portion of software and a plurality of content segments such that the plurality of content segments may be displayed by a device when the portion of software is operated with the device and such that an interruption of operation of the portion of software, the device, or some other software operating on the device will occur during display of a content segment; and provide a bundled arrangement of the portion of software and the content segments.

According to one embodiment of the present invention, an apparatus for providing content includes means for identifying a plurality of content segments; means for identifying a first device associated with a recipient of the content segments and a second device associated with the recipient; means for assisting the first device to display a first of the content segments; and means for assisting a second device to display a second of the content segments. In another embodiment, an apparatus for providing content with a portion of software includes means for identifying a plurality of content segments; means for identifying a device associated with a recipient of the content segments; means for sending at least two of the content segments to the device; and means for assisting the device to display a first of the content segments at a first time and a second of the content segments at a second time, wherein display of a content segment by the device may interrupt operation of the device or software operating on the device. In a further embodiment, an apparatus for providing content with a portion of software includes means for identifying a portion of software; means for identifying a plurality of content segments; means for associating the portion of software and the content segments such that a first of the content segments may be displayed by a device at a first time when the portion of software is operating on the device and such that an interruption of use of the portion of software on the device, the device, or some other software operating on the device will occur when the first content segment is displayed by the device; and means for associating the portion of software and the content segments such that a second of the content segments may be displayed by the device at a second time when the portion of software is operating on the device and such that an interruption of use of the portion of software on the device, the device, or some other software operating on the device will occur when the second of the content segments is displayed by the device. In another embodiment, an apparatus for providing content segments with a portion of software includes means for associating a portion of software and a plurality of content segments such that the plurality of content segments may be displayed by a device when the portion of software is operated with the device and such that an interruption of operation of the portion of software, the device, or some other software operating on the device will occur during display of a content segment; and means for sending a bundled arrangement of the portion of software and the content segments.

According to one embodiment of the present invention, a computer program product in a computer readable medium for facilitating display of at least one content segment may include first instructions for identifying a first content segment and a second content segment; second instructions for identifying at least one device associated with a recipient of the first and second content segments; and third instructions for sending a first content segment to the device at a first time and a second content segment to the device at a second time, wherein display of a content segment by the device may interrupt operation of the device or software operating on the device. In another embodiment, a computer program product in a computer readable medium for providing content with a portion of software includes first instructions for identifying a plurality of content segments; second instructions for identifying a device associated with a recipient of the content segments; third instructions for sending at least two of the content segments to the device; and fourth instructions for assisting the device to display a first of the content segments at a first time and a second of the content segments at a second time, wherein display of a content segment by the device may interrupt operation of the device or software operating on the device. In a further embodiment, a computer program product in a computer readable medium for providing content with a portion of software includes first instructions for identifying a portion of software; second instructions means for identifying a plurality of content segments; third instructions for associating the portion of software and the content segments such that a first of the content segments may be displayed by a device at a first time when the portion of software is operating on the device and such that an interruption of use of the portion of software on the device, the device, or some other software operating on the device will occur when the first content segment is displayed by the device; and fourth instructions for associating the portion of software and the content segments such that a second of the content segments may be displayed by the device at a second time when the portion of software is operating on the device and such that an interruption of use of the portion of software on the device, the device, or some other software operating on the device will occur when the second of the content segments is displayed by the device. In another embodiment, a computer program product in a computer readable medium for providing content segments with a portion of software includes first instructions for associating a portion of software and a plurality of content segments such that the plurality of content segments may be displayed by a device when the portion of software is operated with the device and such that an interruption of operation of the portion of software, the device, or some other software operating on the device will occur during display of a content segment; and second instructions for sending a bundled arrangement of the portion of software and the content segments. In a still further embodiment, a software program includes a portion of software and a plurality of content segments, wherein operation of the portion of software on a device, the device or some other software will be interrupted during at least a portion of at least one display of one or more of the content segments by said device.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

FIG. 12 is an illustration of one potential implementation of the software information database of FIG. 8.

DETAILED DESCRIPTION

Applicants have recognized that there is a need for systems and methods that allow content to be displayed by a device such that operation of the device is altered or otherwise interrupted during display of the content by the device. In addition, applicants have recognized that there is a need for systems and methods to provide periodic content to a device in a manner that increases opportunities or motivations to view the content by a person associated with the device. Further, applicants have recognized that there is a need for systems and methods that allow content to be provided to a device and/or displayed by the device over a period of time.

Interruption of a device (which may be or include interruption of software operating on the device) may be or include disabling or preventing use of a feature of the device or software operating on the device while a content segment is being displayed by the device, slowing down or suspending performance or operation of the device or software while the content segment is being displayed, preventing the device or software displaying a content segment from storing, receiving, transmitting files or other data during display of the content segment, etc. In some embodiments, a user of the device or software may determine when and how a content segment is to be displayed by a device. In other embodiments, a rule, procedure, function, process or algorithm may determine when a content segment is to be displayed by a device, how long the content segment is to be displayed, how many times the content segment can be displayed, what interruption of the device or the software occurs when the content segment is displayed, etc. These and other features will be discussed in further detail below, by describing a system, individual devices, and processes according to embodiments of the invention.

Process Description

Figure 1:
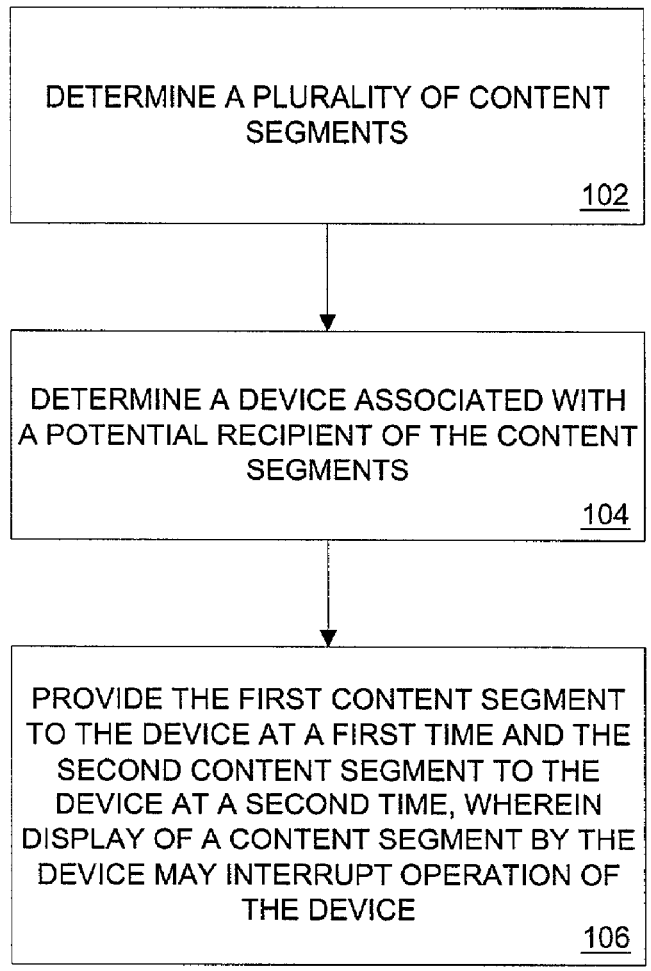
FIG. 1 is a flowchart of a first embodiment of a method in accordance with the present invention.

Reference is now made to FIG. 1, where a flow chart 100 is shown which represents the operation of an embodiment of the present invention. The particular arrangement of elements in the flow chart 100 is not meant to imply a fixed order to the steps; embodiments of the present invention can be practiced in any order that is practicable. In some embodiments, some or all of the steps of the method 100 may be performed or completed by a server, user device and/or another device, as will be discussed in more detail below.

Processing begins at a step 102 during which a plurality of content segments are identified or otherwise determined. A content segment may be or include many things such as, for example, educational or instructional content, an advertisement, survey, image, multimedia file, question, factoid, video file or clip, sound or audio file or clip, rich media file, etc. For example, a content segment may include text or other information regarding world history, art history, baseball, automobile repair, cooking Italian food, Russian movies, philosophy, etc. In some embodiments, information regarding one or more content segments may be stored in, or accessed from, a content information database.

In some embodiments, a content segment may be or form part of a larger group of thematically related content segments that are delivered to one or more recipients over a period of time to help educate, test or instruct the recipient(s). For example, a student studying German may be presented with a series of content segments over time, each of the content segments containing words in both in English and German. Periodically, the student may be provided with a content segment that tests what the student has learned by asking the student one or more questions. If the student answers one or more of the questions incorrectly, later content segments may be directed to such areas to concentrate on the student's areas of weakness. Thus, a later content segment is selected or provided as a result of the correctness or evaluation of an answer or other response to an earlier content segment. As another example, a person interested in art may be presented with a series of, or group of options for, content segments containing text information and/or images regarding famous paintings, painters, museum collections, art patrons, etc. Thus, a recipient may be allowed to select one or more content segments that the recipient wants to receive.

In some embodiments, a display of a content segment by a device may include an audio component and/or a visual component. Thus, in some embodiments, a device may display a content segment by visually displaying the advertisement on a screen or via other means. In other embodiments, a device may display a content segment by playing a music, voice or other sound segment or file.

The step 102 may be implemented in a variety of ways. For example, a device or entity implementing the step 102 or the method 100 may select or identify the content segments based on a specific request or selection from a potential recipient for one or more content segments, an expressed or known interest of a potential recipient, demographic or other person information or attribute of a potential recipient, etc. For example, a potential recipient might specifically request, view or select one or more content segments regarding Spanish literature. As another example, a new company employee may be signed up automatically by the company's human resources department to receive one or more content segments related to company history, policies, products and services, etc. In some embodiments, the identity of a potential recipient may not be known, even if a request for one or more content segments is received from the recipient or another device or entity on behalf of the recipient.

A request for one or more content segments may include information regarding a communication channel for delivery of one or more content segments; information regarding a desired or expected format for one or more content segments; information regarding a recipient (e.g., identifier, name, preference information, demographic information) of one or more content segments; information regarding a device (e.g., an identifier, technical capabilities) receiving, storing and or displaying one or more content segments; etc.

In some embodiments, the step 102 or the method 100 may include identifying the recipient or otherwise determining the identity of the recipient. Such a determination may include selecting a recipient from a group of potential recipients; identifying a recipient from data included in a request to provide one or more content segments; or identifying a recipient based, at least in part, on an attribute (e.g., fingerprints, writing style, usage or communication pattern) of a recipient.

A request or other notification regarding one or more content segments may be received in any form or format, including, but not limited to, an HTTP (Hypertext Transfer Protocol), HTML (Hypertext Mark-up Language) or FTP (File Transfer Protocol) transmission, XML (Extensible Mark-up Language) feed, email message, instant message communication, facsimile or radio transmission, telephone call, electronic signal or communication, etc. In some embodiments, a notification or other data indicative of a request, selection or determination of a content segment may be received and/or sent.

In some embodiments, selection of one or more content segments may be based on a device associated with a potential recipient or a communication channel available to the device. For example, in some embodiments, a device or recipient or other entity may request, identify, select or otherwise determine a content segment based on the communication channel established between the recipient's device and the server or other device implementing the method 100 or serving the content segments. For example, if the communication channel between a device providing a content segment and a device receiving the content segment is a low bandwidth or slow communication network or line, the content segment indicated or selected may include only text information or simple graphics to allow the content segment to be transmitted quickly via the communication channel. Alternatively, if the communication channel between the devices is a high bandwidth or fast communication network or line, the content segment may include animations, complex graphics, rich media, music or other sound files, etc. Thus, in some embodiments, a device transmitting or receiving a content segment, a recipient, or some other device or party may determine the communication channel capacity or capabilities between the device receiving the content segment and the device providing or transmitting the content segment and/or determine one or more attributes of a receiving or sending device (e.g., ability to visually display images, ability to play sound files, capacity to store files).

In some embodiments, selection of one or more content segments may be based on the time available to transmit or receive one or more of the content segments. For example, a device sending a content segment may have limited time available. Thus, a content segment may be selected during the step 102 that can be sent during the available time. Similarly, a device receiving a content segment also may have limited time available. Thus, a content segment may be selected during the step 102 that can be received by the device during the available time. In some embodiments, the step 102 may include determining at least one time window of opportunity to provide one or more content segments to a device, availability or accessibility of a device, etc.

During a step 104, one or more devices are determined that are associated with a potential recipient of the content segments determined during the step 102. Information regarding a device may be received in a request or other notification from or in regard to the potential recipient. For example, a recipient may request two or more content segments and include information regarding one or more devices associated with the recipient in the request. Alternatively, in some embodiments, information regarding one or more devices and/or recipients may be stored in, or accessed from, a user information database and/or a user device information database. Thus, once a recipient is identified, a device associated with the recipient may be determined by accessing the appropriate database of information.

In some embodiments, a recipient may have more than one device associated with him or her. For example, a recipient may have a two-way pager, a cellular telephone, and a wireless personal digital assistant. Thus, the step 104 may include selecting one or more devices from multiple devices associated with a recipient, receiving an indication regarding which device is to be used or which device is to be used during a specific time period, etc. The step 104 may include selecting a device from a plurality of devices associated with a recipient.

In some embodiments, determining a device may be or include determining an address for the device, determining a communication channel or link to the device, etc., even if the device or type of device is not known or determined.

The determination of a device made during the step 104 may be based, in whole or in part, on accessibility, availability, or technical capabilities of the device, accessibility, availability or capacity of a communication channel to the device, the desire, request or command of a recipient associated with the device or another entity, etc. For example, if a recipient has both a cellular telephone and a pager, but the cellular telephone does not appear to be turned on, receiving phone calls, etc., the pager may be selected during the step 104.

During a step 106 a first of the content segments determined during the step 102 is provided to the device during the step 104 at a first time and a second of the content segments determined during the step 102 is provided to the device at a second time. In addition, in some embodiments, display of a content segment by a device may interrupt operation of the device. The content segment and the software operating on or provided to the device may be integrated or otherwise bundled in such a way to create or initiate such an interruption. Providing a content segment to a device may include one or more of the following: providing, serving, downloading, transmitting, etc. the content segment to a user device, server or other device; including the content segment in an electronic communication (e.g., email message, cellular telephone call, instant message communication, XML feed, HTTP, FTP or HTML transmission); providing an electronic address where the content segment can be found, requested, operated, accessed and/or retrieved by the device; etc.

The step 106 may be implemented in a variety of ways. For example, in some embodiments a device or entity implementing the step 102 or the method 100 may provide both the first and second of the content segments to the device at, during or prior to the first time and allow the device to display the first of the content segments at the first time and the second of the content segments at the second time. The first and second content segments may be stored on the device. Alternatively in some embodiments a device or entity implementing the step 102 or the method 100 may provide to the device at, during, or prior to the first time data (e.g., a link, URL, database address, electronic address) indicative of a location of the first content segment and/or the second content segment. The device may then retrieve or download the first content segment at, during or prior to the first time and the second content segment at, during or prior to the second time.

In some embodiments, the step 106 may include interrupting display of content by the device by displaying the first and/or second content segments on the device; interrupting operation of the device and displaying the first and/or second content segments on the device; and/or interrupting operation of a software program on the device and displaying the first content segment on the device.

An interruption of use of device (which may be or include interruption of software operating on the device) may occur in a variety of ways. For purposes of explanation of the present invention and the claims that follow, the phrases "interruption of use" and "interruption of operation" will be used interchangeably. In some embodiments, an interruption of a device may include one or more of the following: a delay in operation of the device or software operating on the device while a content segment is being displayed by the device; a temporary prevention or delay of use of at least one feature of the device or software operating on the device while a content segment is being displayed by the device; a suspension or delay of usability of the portion of the device or software operating on the device while a content segment is being displayed by the device; a delay in visual display of data by the device or software operating on the device; a delay in transmission, storage or reception of data by the device or software operating on the device; etc.

In some embodiments, an interruption may be or include display or "popping up" of a window, graphic, frame, etc. that contains or includes an advertisement, which may be temporary or permanent or last until a user responds to the advertisement (e.g., by clicking on the advertisement) in some predefined manner. An interruption may be or include delays, preventions or other delays in calls made by software and/or a device regarding an operating system, delays or other interruptions in screen displays, etc.

In some embodiments, an interruption may include one or more of the following: an interruption in display of material by a device or a portion of software operating on the device; a delay in use or manipulation of data by a device or a portion of software operating on the device; a display of a window by a device or a portion of software operating on the device, a change in display of material by a device or software operating on the device from foreground to background or from background to foreground, etc.

In some embodiments, an interruption may cause or generate a display of a window, frame, image, graphic, etc. by a device or software operating on the device.

In some embodiments, the step 106 or the method 100 may include determining the first time and/or the second time. The time(s) at which one or more content segments may be selected or indicated by a recipient of the content segments; may be based on availability, accessibility or capability of the device receiving the content segments; may be based on availability, accessibility or capacity of a communications channel to a device, etc. Thus, the step 106 or the method 100 may include providing a recipient with options for the first and/or second times; allowing the recipient to select, indicate or request the first and/or second times; determining availability, accessibility or capability of the device receiving the content segments; determining availability, accessibility or capacity of a communication channel to the device, etc.

In some embodiments, the step 106 or the method 100 may include one or more of the following: receiving a notification regarding the first time and/or the second time from the recipient; determining an attribute of the recipient and/or the device; selecting the first time and/or the second time at random; selecting the first time and/or the second time to be during a period of accessibility or availability of the device; selecting the first time and/or the second time based, at least in part, on an external event (e.g., off peak hours for a communication channel to the device); selecting the first time based, at least in part, on an attribute of the recipient (e.g., the recipient is an early riser, the recipient commutes on a train to work) and/or the device; selecting the second time based, at least in part, on a length of time between the first time and a time at which a response to the first content segment is received; determining the first time and/or the second time based, at least in part, on a number of content segments and/or a length of time available to display some or all of content segments determined during the step 102; determining the first time and/or the second time based, at least in part, on a minimum or maximum length of time to be used to display all of some or all of the content segments determined during the step 102; determining the first time and/or the second time based, at least in part, on a format of one or more of the content segments determined during the step 102, determining the second time based, at least in part, on a response provided to the first content segments or a previous content segment by a recipient; determining a time period during which one or more content segments should be provided and or displayed and randomly or otherwise selecting the first time and/or the second time to be with the time period, etc.

In some embodiments, two or more content segments may be provided at intervals to a device and/or displayed at intervals by the device. Thus, the step 106 or the method 100 may include determining a time interval associated with the content segments determined during the step 102, the device, or the recipient, wherein the second time occurs at least the time interval after the first time; determining a time interval associated with the recipient, wherein the second time occurs at least the time interval after the first time; determining a time interval associated with the content segments determined during the step 102, wherein the first time occurs at least the time interval after receipt of a request to provide one or more content segments; or determining a time interval associated with the content segments determined during the step 102, wherein the first time occurs at least the time interval after receipt of a request to one or more content segments and the second time occurs at least the time interval after the first time.

In some embodiments, one or more rules, procedures, algorithms, functions, heuristics, routines, expert systems, learning systems, conventions, policies, etc. may be determined, selected, received or otherwise established to govern how, how long, when, under what circumstances, etc. a content segment may be sent to, used with or displayed by a device. The method 100 may include a step of establishing, receiving, accessing, selecting or otherwise determining one or more of such rules, procedures, algorithms, functions, heuristics, routines, expert systems, learning systems, conventions, policies, etc.

In some embodiments, a server, user device or other device or entity implementing the method 100 may determine a number of times one or more content segments has been or will be displayed by a device, a length of time one or more content segments has been or will be displayed by a device, receive feedback or responses from a recipient or user viewing one or more content segments, evaluate or determine correctness of one or more responses to one or more content segments, determine a desired or requested format (e.g., text only, rich media) for one or more content segments, identify a time period during which one or more content segments can or should be provided to a device or displayed by the device, determine a duration of time that a content segment should or has been displayed by a device, determine a rule governing when, how long, etc. a content segment should be provided to a device or displayed by the device, receiving a notification regarding a selection of at least one of the content segments determined during the step 102, receiving a notification regarding accessibility or availability of a device, receiving a notification regarding a communication channel to a device; determining a benefit associated with viewing, storing, displaying, receiving, responding to or evaluating one or more content segments, providing a notification of a benefit associated with a content segment, device or recipient, etc.

In some embodiments, a relationship or bundling may be established between one or more content segments provided to, stored on, accessible to, and/or displayed by a device and software operating on the device. There are at least three different ways that one or more content segments might be associated, integrated or otherwise bundled with a portion of software such that a relationship is formed. First, a content segment (or one or more links to the content segment, one or more content segment calls or call returns to the content segment, etc.) might be inserted or otherwise included in the code, instructions, programming, etc. for the portion of software such that the content segment forms part of the portion of software or data, files, etc. associated or used with the portion of software. Thus, while the content segment is being displayed by a device, the remaining portion of software may be limited in operation, display, use, accessibility, etc. via the device.

As a second possible implementation or bundling, a relationship may be established between two separate software programs, a first software that is or includes the portion of software and a second software program that is or includes the content segment (or one or more links to the content segment) and at least partially governs or controls display of the content segment and the operation of the portion of software. For example, the second program may be able to suspend or otherwise interrupt operation and/or use of the first program while the content segment is being displayed. The first program already may be resident and operating on the device prior to the second program being stored on or operated with the device. Thus, the second program may be supplied or used independently of the first program.

As a third possible implementation, a software program that includes a content segment (or one or more links or calls to the content segment) may be able to override an operating system, registry, etc. operating on a device such that the content segment can be displayed by the device and such that operation, display, use, etc. of one or more other portions of software operating on the device can be suspended, delayed, or otherwise interrupted. Thus, a relationship is established between the content segment and a portion of software operating on the device, even though the portion of software may change and selection of the portion of software may be controlled by a user of the device. Screen displays, calls to and/or from an operating system made by the device, software operating on the device, etc. may be delayed or prevented as part of an interruption.

Figure 2:
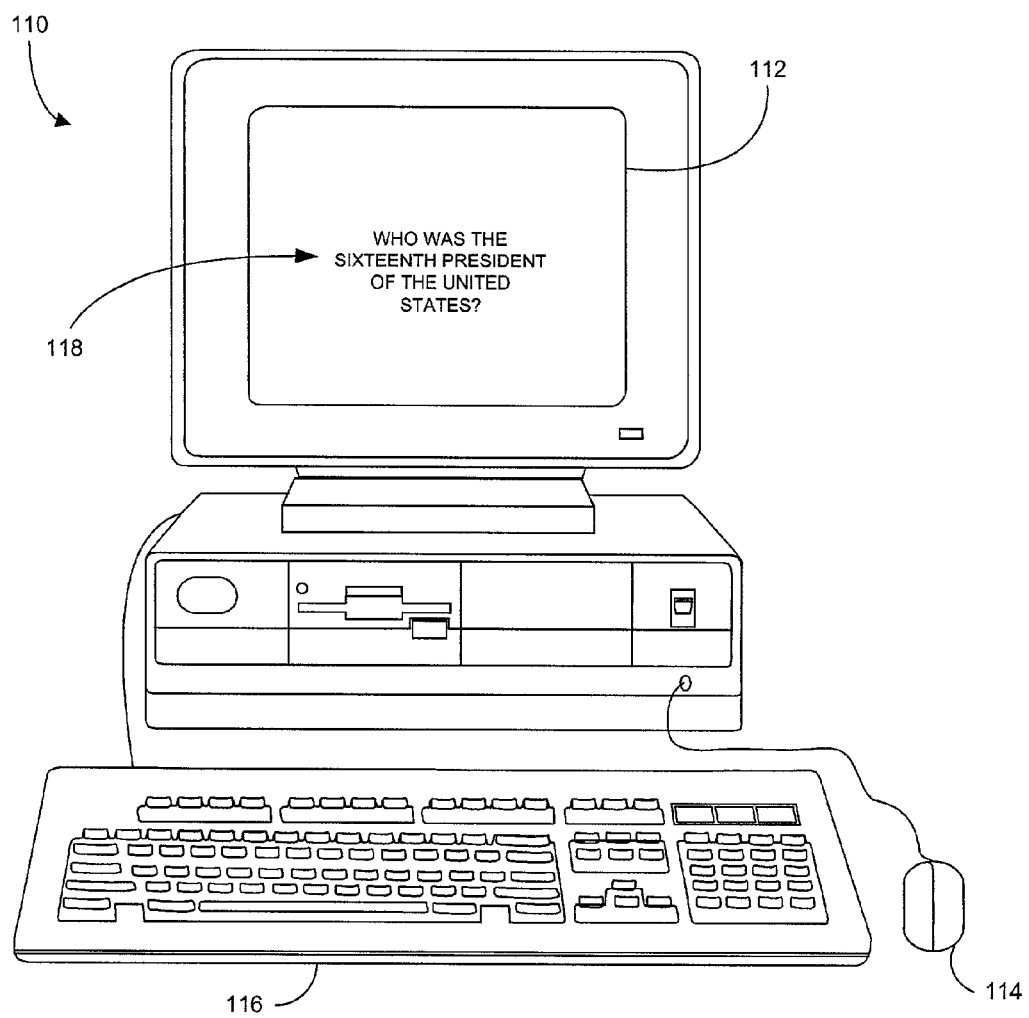
FIG. 2 is an illustration of a content segment displayed on a computer in accordance with the method of FIG. 1.

Now referring to FIG. 2, a computer system 110 is illustrated that includes a conventional screen or display 112, mouse 114 and keyboard 116. In accordance with the methods disclosed herein, a content segment 118 consisting of a text portion is displayed by the computer 110 on the screen 112. The content segment 118 includes a question directed to U.S. presidential history. A later content segment displayed by the computer may provide the answer. The content segment 118 can be used to instruct a user viewing the content segment 118 on U.S. presidential history.

Figure 3:
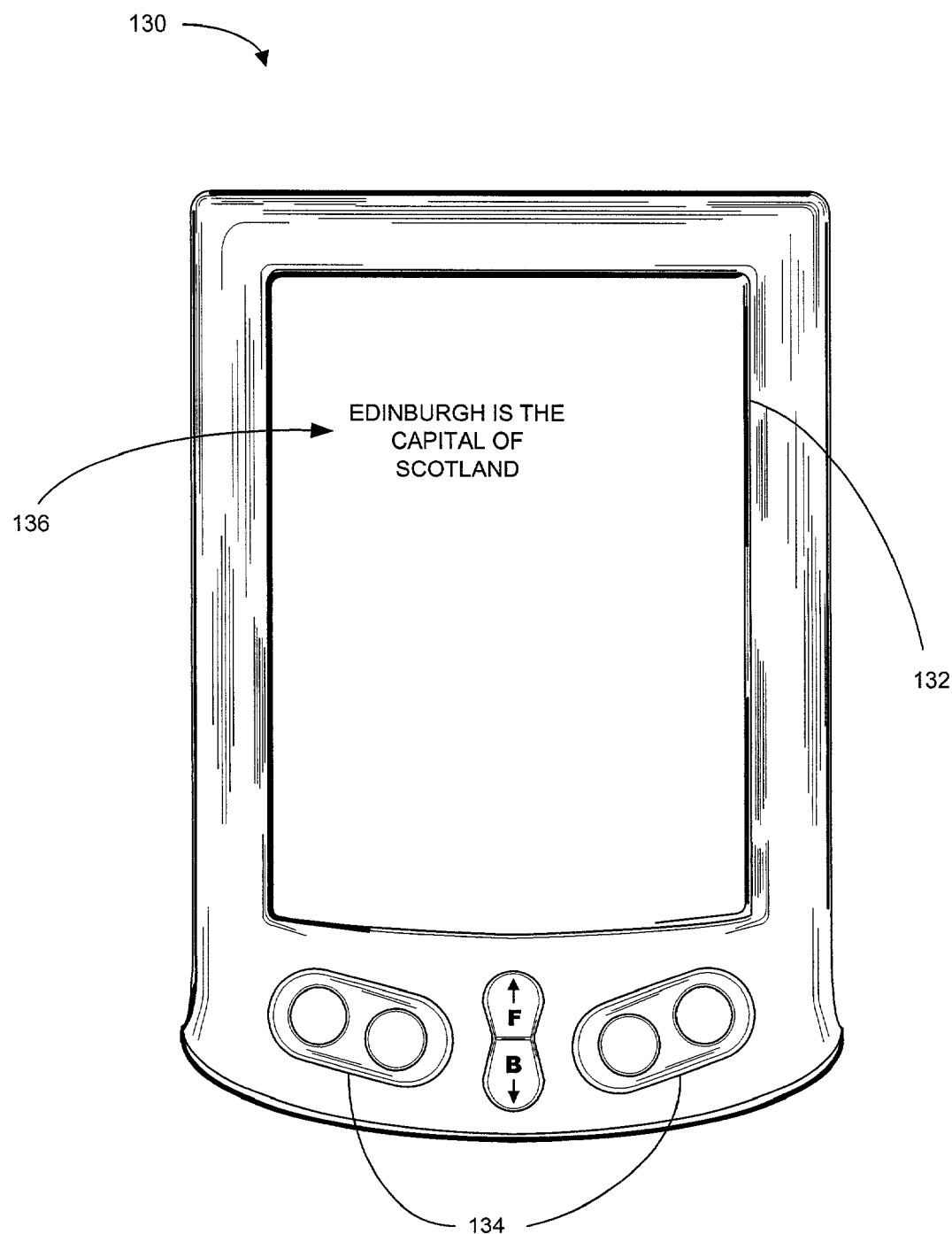
FIG. 3 is an illustration of a content segment displayed on a personal digital assistant in accordance with the method of FIG. 1.

As the methods disclosed herein also may be used with other types of devices, a content segment may be displayed on a personal digital assistant 130 is illustrated in FIG. 3. The personal digital assistant 130 includes a conventional screen 132 and buttons 134. The content segment 136 displayed is displayed by the personal digital assistant on the screen 132. The content segment 136 includes a world or Scottish geography fact and can be used to educate a user viewing the content segment 132 on such a topic.

Figure 4:
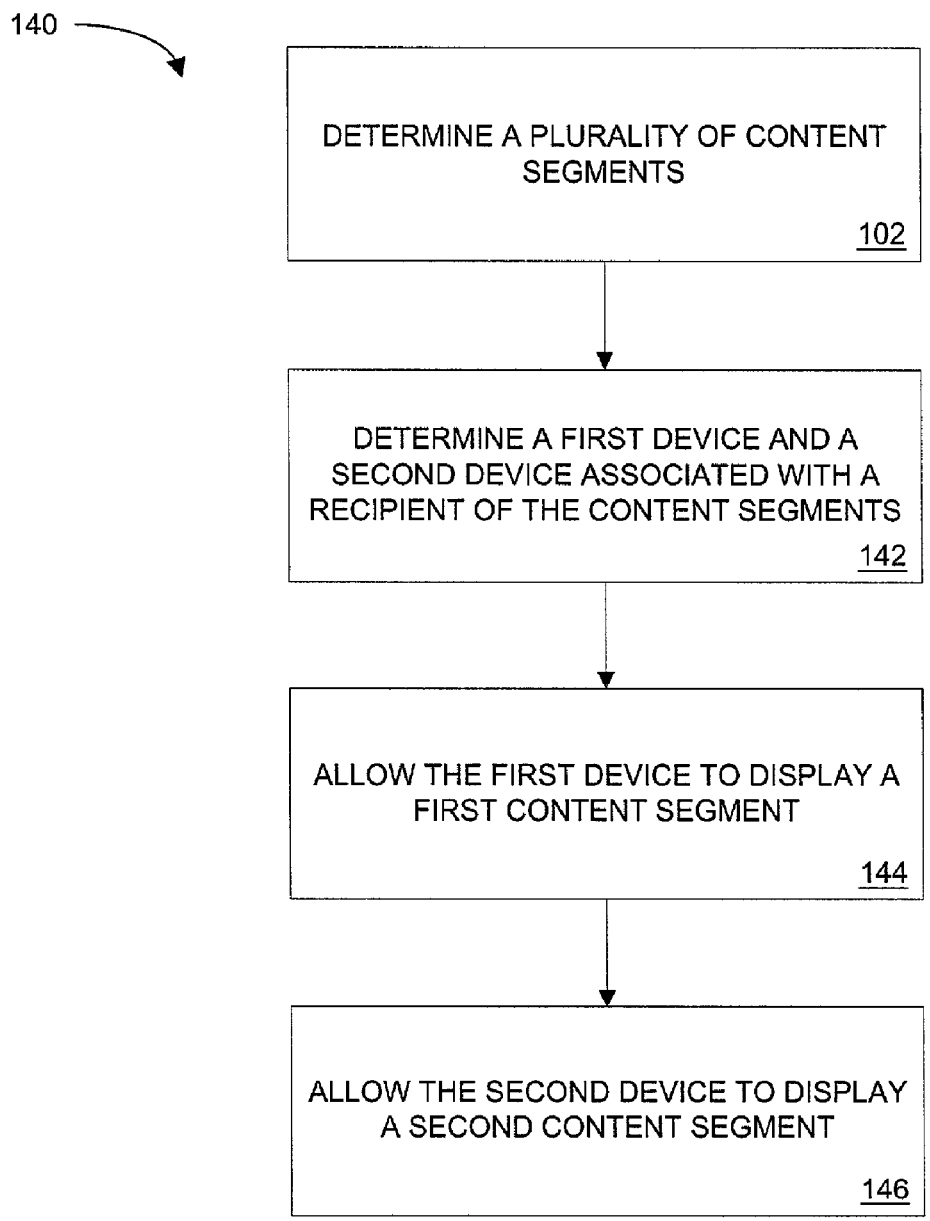
FIG. 4 is a flowchart of a second embodiment of a method in accordance with the present invention.

Reference is now made to FIG. 4, where a flow chart 140 is shown which represents the operation of a second embodiment of the present invention. The particular arrangement of elements in the flow chart 140 is not meant to imply a fixed order to the steps; embodiments of the present invention can be practiced in any order that is practicable. In some embodiments, some or all of the steps of the method 140 may be performed or completed by a server, user device and/or another device, as will be discussed in more detail below.

The method 140 is particularly useful when a recipient has more than two devices associated with him or her that can receive one or more content segments. For example, a person interested in basketball may receive information regarding games in progress, basketball history, etc. via a cellular telephone during the day and via a pager via the evening.

The method 140 includes the step 102 as previously discussed above. In addition, the method 140 includes a step 142 during which two devices associated with a recipient are determined in a manner similar to that previously discussed above with respect to the step 104.

During a step 144, a first device identified during the step 142 is allowed to display one of the content segments determined during the step 102. The step 144 may be or include providing the content segment to the first device in a manner similar to that discussed above. During a step 146, a second device identified during the step 142 is allowed to display one of the content segments determined during the step 102. The step 146 may be or include providing the content segment to the first device in a manner similar to that discussed above. In some embodiments, allowing a device to display a content segment may include allowing or enabling the device to retrieve the content segment and/or display the content segment, providing data or a signal to the device regarding when and how to display a content segment and/or where to locate the content segment, triggering display of a content segment on the device, etc.

In some embodiments, the method 140 may include providing a content segment to the first device, providing a content segment to the second device, providing data indicative of a location of a content segment to the first device, and/or providing data indicative of a content segment to the second device. In some embodiments, display of a content segment on a first device and/or a second device may interrupt operation of the first device and/or the second device as previously discussed above. The method 140 also may include variations and steps as previously discussed above.

Figure 5:
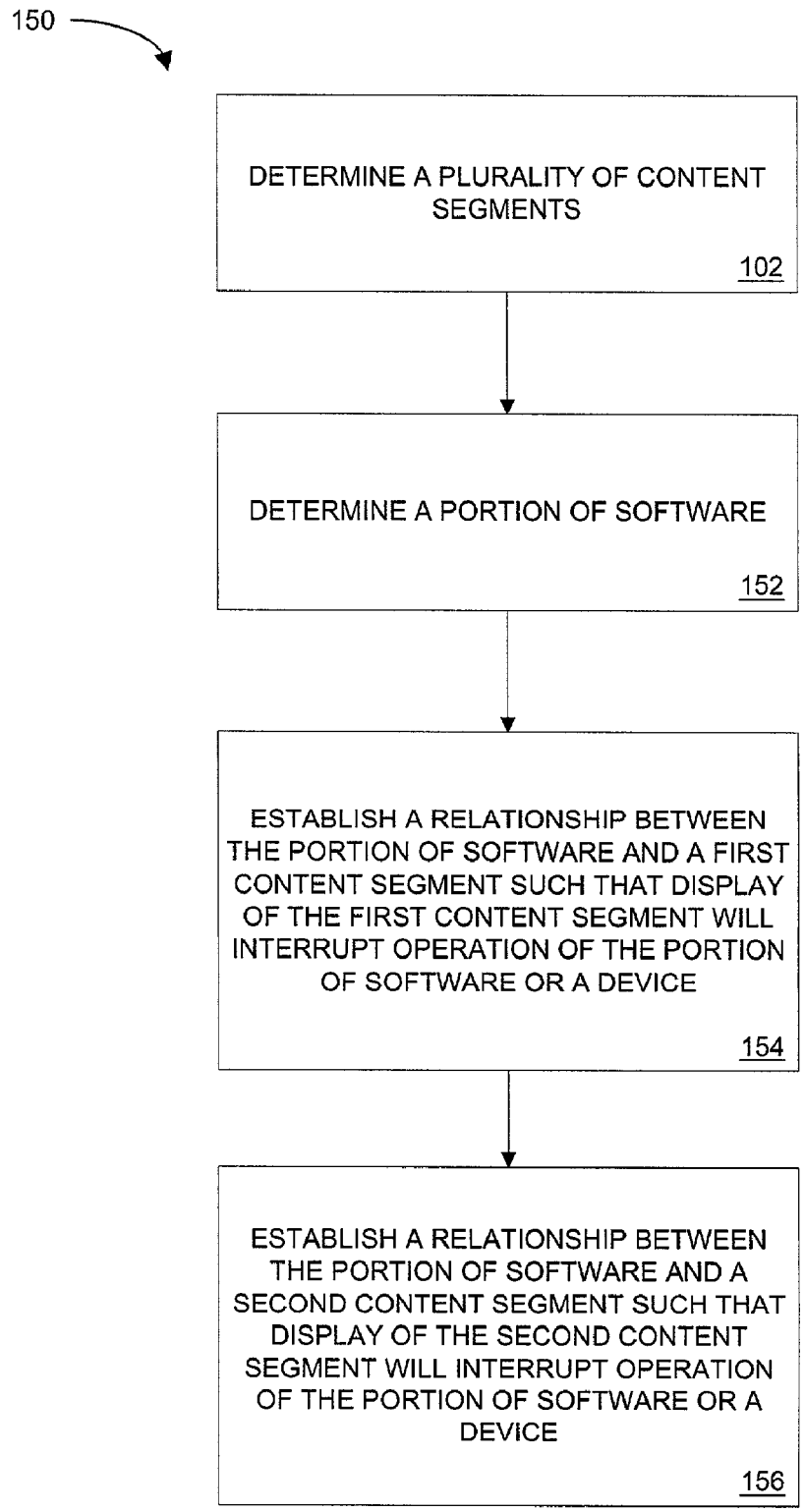
FIG. 5 is a flowchart of a third embodiment of a method in accordance with the present invention.

Reference is now made to FIG. 5, where a flow chart 150 is shown which represents the operation of a third embodiment of the present invention. The particular arrangement of elements in the flow chart 150 is not meant to imply a fixed order to the steps; embodiments of the present invention can be practiced in any order that is practicable. In some embodiments, some or all of the steps of the method 150 may be performed or completed by a server, user device and/or another device, as will be discussed in more detail below.

The method 150 includes the step 102 as previously discussed above. In addition, the method 150 includes a step 152 during which a portion of software is determined. The software may be an operating system, software application (e.g., word processing program, spreadsheet program, browser), Java script, applet, or any other type of code, computer program, or list or set of computer instructions. In some embodiments, the software may be executable. In some embodiments, a device or entity implementing the method 150 or the step 152 may determine the portion of software during the step 152 by receiving or retrieving the portion of software from another device or entity, a database, etc. For example, a device or entity implementing the method 150 may receive the portion of software from a software developer that wants to incorporate one or more content segments into the software or otherwise associate or bundle one or more segments with the portion of software. In some embodiments, a device or entity implementing the method 150 or the step 152 may receive data indicative (e.g., a link, URL) of a location of the portion of software prior to retrieving, downloading or receiving the software. Information regarding one or more portions of software may be stored in or accessed from a software information database. In some embodiments of the method 150 and the other methods disclosed here, the portion of software determined during the step 152 may be limited to executable software.

In some embodiments, a device or entity implementing the method 150 or the step 152 may select or otherwise identify the portion of software from a plurality of portions of software. For example, a software producer or developer that wishes to include one or more content segments may select one or more programs based on release dates of the programs, the demographic profiles of anticipated customers or users of the software, the requirements or desires of an entity supplying the content segments, etc. In some embodiments information regarding one or more software providers or products may be stored in, or accessed from, a software information database.

During a step 154, a relationship, integration or other bundling is established between the portion of software identified during the step 152 and a first of the content segments identified during the step 102 such that the content segment can be displayed by a device (e.g., a computer, personal digital assistant, cellular telephone, pager) when the portion of software is operating on the device and/or such that operation, use, display, etc of the portion of software will be at least partially or temporarily interrupted during display of the content segment by the device. In variations of the method 150, an interruption in operation of the device itself and/or of some other software operating on the device may occur instead, or in addition to, interruption of the portion of software determined during the step 152. As previously discussed above an interruption of use of a portion of software may occur in a variety of ways. For example, during display of a content segment by a device, use or other operation of a word processing, spreadsheet, billing or other software program operating may be temporarily suspended on the device until the content segment is no longer displayed by the device. As another example, display of a content segment by a device, display of images, graphics, etc. generated by operation of a word processing, spreadsheet, billing or other software program operating may be temporarily suspended such that nothing is displayed by the device other than the content segment. In some embodiments, a relationship or other bundling between the portion of software determined during the step 152 and multiple content segments may be established during the step 154.

During a step 156 a relationship or other bundling is established between the portion of software identified during the step 152 and a second of the content segments identified during the step 102 such that the content segment can be displayed by a device (e.g., a computer, personal digital assistant, cellular telephone, pager) when the portion of software is operating on the device and/or such that operation, use, display, etc of the portion of software, the device, or some other software operating on the device will be at least partially or temporarily interrupted during display of the content segment by the device. The step 156 is similar to the step 154 and may occur as part of the step 154.

As mentioned above, in some embodiments or the methods disclosed herein, links, calls, Uniform Resource Locators (URLs), or other data indicative of a location of a content segment may be inserted or included in, or otherwise associated or bundled with, the portion of software instead of the content segment itself. This allows an indirect relationship to be established between a content segment and the portion of software. When a call or request is made by a device to the link, URL or other data, the content segment may be retrieved or accessed for display by the device. Selection of a content segment may be made in advance or may change over time or by user. For example, the step 154 and/or 156 may include inserting a link to a content provider or server and other code into a portion of software. When a call or request for the content segment is made by a device to the provider or server using the link, the provider or server may select an content segment to serve or download to the device. The call or request may include user or user device information, content segment identifier, a user identifier, etc. The provider or server may select the content segment based on personal, background or demographic information associated with a user of the device, the location of the device, the occurrence of an external event (e.g., holiday), the availability or accessibility of a content segment, etc. The provider or server may update or change content segments over time as content segments expire, are updated or replaced, etc. Thus, multiple uses of the same link by a device or software operating on the device may result in different content segments being retrieved or displayed by the device.

In some embodiments, a device, recipient, or other device or entity may request or select one or more content segments based on the communication channel established between a device providing the content segment(s) and the device receiving the content segment(s). In some embodiments, establishing a relationship between a portion of software and a content segment may include providing the portion of software and the content segment to a device or a recipient; providing the portion of software and a link to the content segment to a device or a recipient (or vice versa); storing the content segment and/or the portion of software on a computer readable medium (e.g., floppy disk, CD-ROM); etc.

In some embodiments, the steps 154, 156 or the method 150 may include one or more of the following: determining when, under what circumstances and/or how a content segment will or can be displayed by a device or to a recipient; determining a length of time a content segment will or can be displayed by a device or to a recipient; providing a notification of the relationship or bundling between the portion of software and the content segment, providing a signal to the device regarding when and how to display a content segment, triggering display of a content segment by a device, etc.

In some embodiments of the method 150 or other methods disclosed herein, a display of a content segment by a device may last for a limited period of time. The length of time may be based, in whole or in part, on many things such as, for example: the number of times one or more content segments has been displayed by the device, the rate of display of one or more content segments by the device, demographic information of a recipient associated with the device, storage or other technical capabilities or operational features of the device, the type or nature of the portion of software, etc. In some embodiments, a relationship or other bundling may be established between a portion of software and a content segment such that the content segment can or will be displayed a minimum, maximum, finite, or random number of times by a device in conjunction with the portion of software. In other examples, a content segment may be displayed by a device at regular time intervals or at random, at the request of a user of the device, as or as part of a screen saver for the device, at a regular interval or random number of keystrokes or data entries made by a user, every time a user uses or accesses a specific feature of the device or the portion of software associated or bundled with the content segment, the occurrence of an external event (e.g., Thanksgiving, a sale at a particular store, a restaurant opening, an overstock or oversupply of a product), etc. As another example, display of a content segment by a device may be governed in whole or in part by a usage pattern of a user. More specifically, the content segment may be displayed by a device every time the user hits or enters a specific set of keys, commands or data, every time the device or portion of software is idle or unused for a minimum period of time, every time the user hits a key or makes an entry after the device or portion of software has been idle or unused for a minimum period of time, etc.

In some embodiments, the method 150 or other methods disclosed herein may include a step of determining a benefit available as a result of a display of a content segment by a device and/or a viewing of the content segment by a recipient. For example, a purchaser of an accounting software program (i.e., a portion of software) may receive a retroactively applied rebate on the price of the software program as a result of viewing one or more content segments displayed by a computer when the purchaser is operating or using the software program with the computer. As another example, a recipient may receive frequent flyer miles for each content segment viewed by the recipient user or displayed on or by a device associated with the recipient. As another example, speed or performance of a portion of software on a device may be increased as a recipient views one or more content segments associated or bundled with portion of software or the content segments or displayed by the device and/or decreased as the total or rate of displays of content segments decreases over time or during a time period. As still another example, availability of features (e.g., the ability to print, transmit, receive or store files or documents) of the portion of software may be increased as content segments are displayed by the device.

A benefit may be or include many things such as, for example, an improvement in performance of a portion of software or a device; an availability of a feature provided by a portion of software or a device; a rebate for a previous purchase of a portion of software or a device; a discount for a future purchase of a portion of software or a device; a credit; cash or other monetary amount; a coupon; frequent flyer miles; long distance calling time; etc.

In some embodiments, a benefit may be based on one or more of the following: feedback, answers or other responses from a recipient regarding a content segment, a device, or a portion or software; a time of day; a month or season of year; a day of week; a number of updates to a portion of software and/or an content segment requested by or provided to a recipient; a demographic or biometric characteristic or measurement of a recipient; a previous recipient reaction to a content segment; amount or quality of feedback or other information provided by a recipient; one or more previous content segments viewed; a number of advertisements displayed by a device during a time period; an action taken by a recipient in response to a content segment; a monetary amount or rate associated with a content segment; a status or social index associated with a recipient; a price associated with a portion of software; a number of displays of a content segment by a device; a length of time a content segment is displayed by a device; a number of times a portion of software is operated with a device; a length of time a portion of software is operated with a device; etc.

Obtaining feedback from a recipient may be conducted actively by asking the recipient one or more questions, which may be included as part of a content segment or follow the display of a content segment. Alternatively, feedback may be obtained from a user passively by monitoring the user's actions (e.g., mouse movements, keyboard strokes, head motion, body heat). Thus, one or more of the methods disclosed herein may include monitoring or determining viewing behavior by a user. An evaluation of viewing behavior may be based, at least in part, on the user's duration of exposure to a content segment, the number of times a user is exposed to a content segment, biometric information from the user, the user's responses to a content segment, the size or exposure duration of an content segment, etc.

In some embodiments, determining a benefit available for or associated with display of a content segment may include one or more of the following: receiving a notification of the benefit; allowing a recipient to select from a plurality of benefits; offering a choice or plurality of benefits to a recipient and receiving a notification from the recipient of a selection of at least one of the benefits; receiving a request from a recipient for a benefit; and/or selecting the benefit from a group of currently available of benefits.

In some embodiments, the method 150 or other methods disclosed herein may include providing a notification of a benefit. Providing a notification of the benefit may include one or more of the following: providing the notification to a recipient, a device, a provider or receiver of the benefit, a provider or user of a content segment, etc.; and/or sending an electronic communication to an address associated with a user, a device, a provider or receiver of the benefit, a provider or user of a content segment or portion of software, etc. A notification may be in any format or form, including, but not limited to, HTTP, HTML or FTP transmission, XML feed, email message, instant message communication, facsimile or radio transmission, telephone call, electronic signal or communication, etc.

Figure 6:
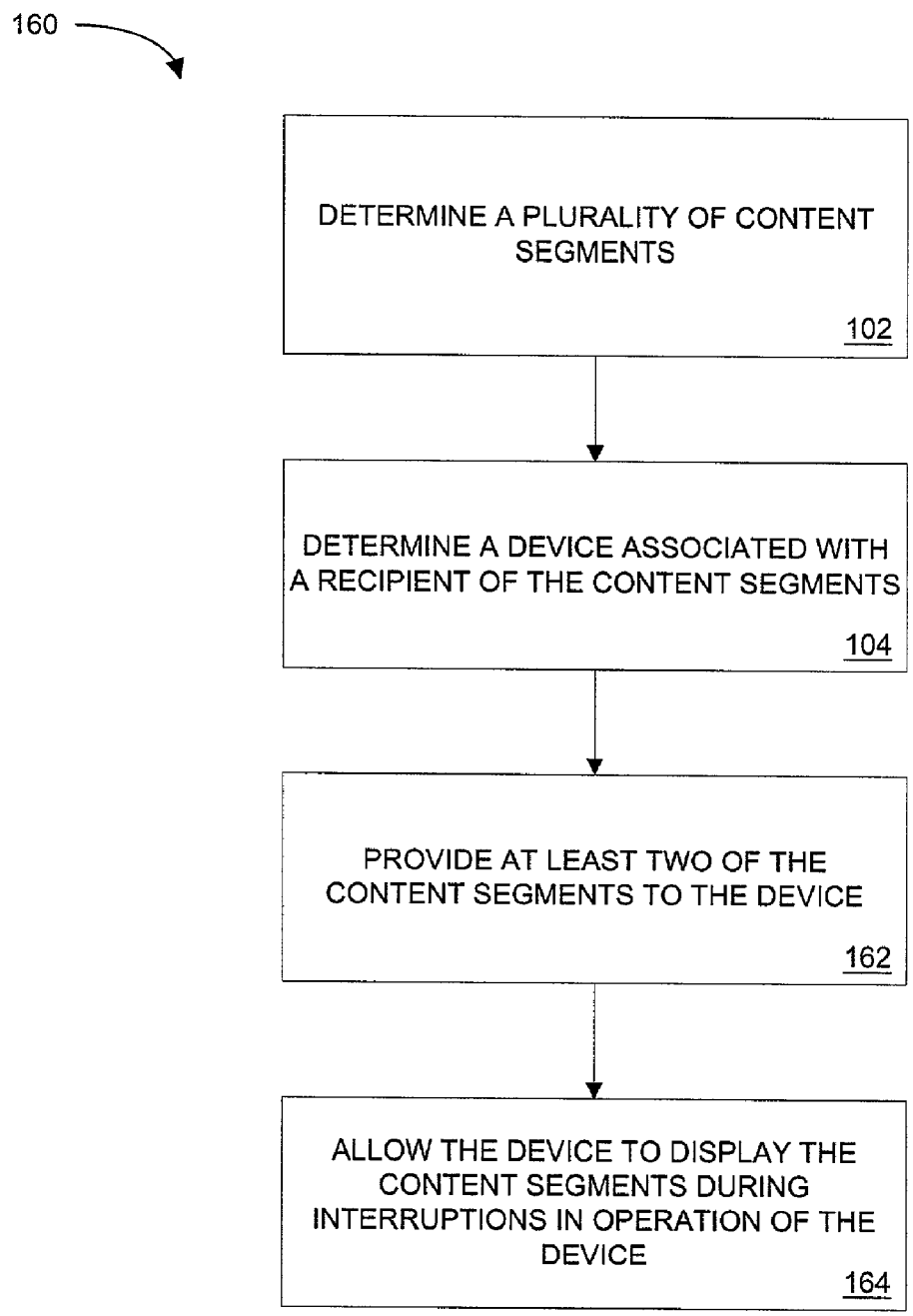
FIG. 6 is a flowchart of a fourth embodiment of a method in accordance with the present invention.

Reference is now made to FIG. 6, where a flow chart 160 is shown which represents the operation of a fourth embodiment of the present invention. The particular arrangement of elements in the flow chart 160 is not meant to imply a fixed order to the steps; embodiments of the present invention can be practiced in any order that is practicable. In some embodiments, some or all of the steps of the method 140 may be performed or completed by a server, user device and/or another device, as will be discussed in more detail below.

The method 160 includes the steps 102 and 104 as previously discussed above. In addition, the method 160 includes a step 162 during which at least two of the content segments determined during the step 102 are provided to a device determined during the step 104 in a manner as previously discussed above. Providing a content segment may be or include providing data indicative (e.g., link, URL) of a location of the content segment. During a step 164, the device is allowed to display the content segments such that operation of the device is interrupted in a manner as previously discussed above. In some embodiments, the content segments may be stored on the device or retrieved by the device. In variations of the method 160, interruption of the device may be or include interruption of software operating on the device.

Other embodiments of the methods and apparatus discussed herein are also possible. For example, in other embodiments of the method of the present invention, a method for using a content segment with a portion of software may include receiving a portion of software; receiving one or more content segments or data indicative of locations of the content segments, the content segment(s) being associated with the portion of software such that operation of the portion of executable software on a device can be interrupted during at least a portion of at least one display of a content segment by the device; and/or operating the portion of software. The device also may store the portion of software and/or the content segment(s).

As another example, in other embodiments of the method of the present invention, a method for using one or more content segments may include determining a plurality of content segments; determining a device that can receive the content segments; and receiving a first of the plurality of content segments at a first time and the second of the content segments at a second time, wherein display of a content segment by the device may interrupt operation of the device or software operating on the device.

As another example, in other embodiments of the method of the present invention, a method for using one or more content segments may include integrating or otherwise bundling a portion of software and a plurality of content segments such that the plurality of content segments may be displayed by a device when the portion of software is operated with the device and such that an interruption of operation of the portion of software, the device, or some operation software operating on the device will occur during display of a content segment; and providing a bundled arrangement of the portion of software and the plurality of content segments.

As another example, in other embodiments of the present invention, a software program may include a portion of software and a plurality of content segments, wherein operation of the portion of software on a device, the device, or some other software operating on the device will be interrupted during at least a portion of at least one display of one or more of the content segments by the device. A method in accordance with the present invention may include providing, storing and/or receiving such a software program.

System

Figure 7:
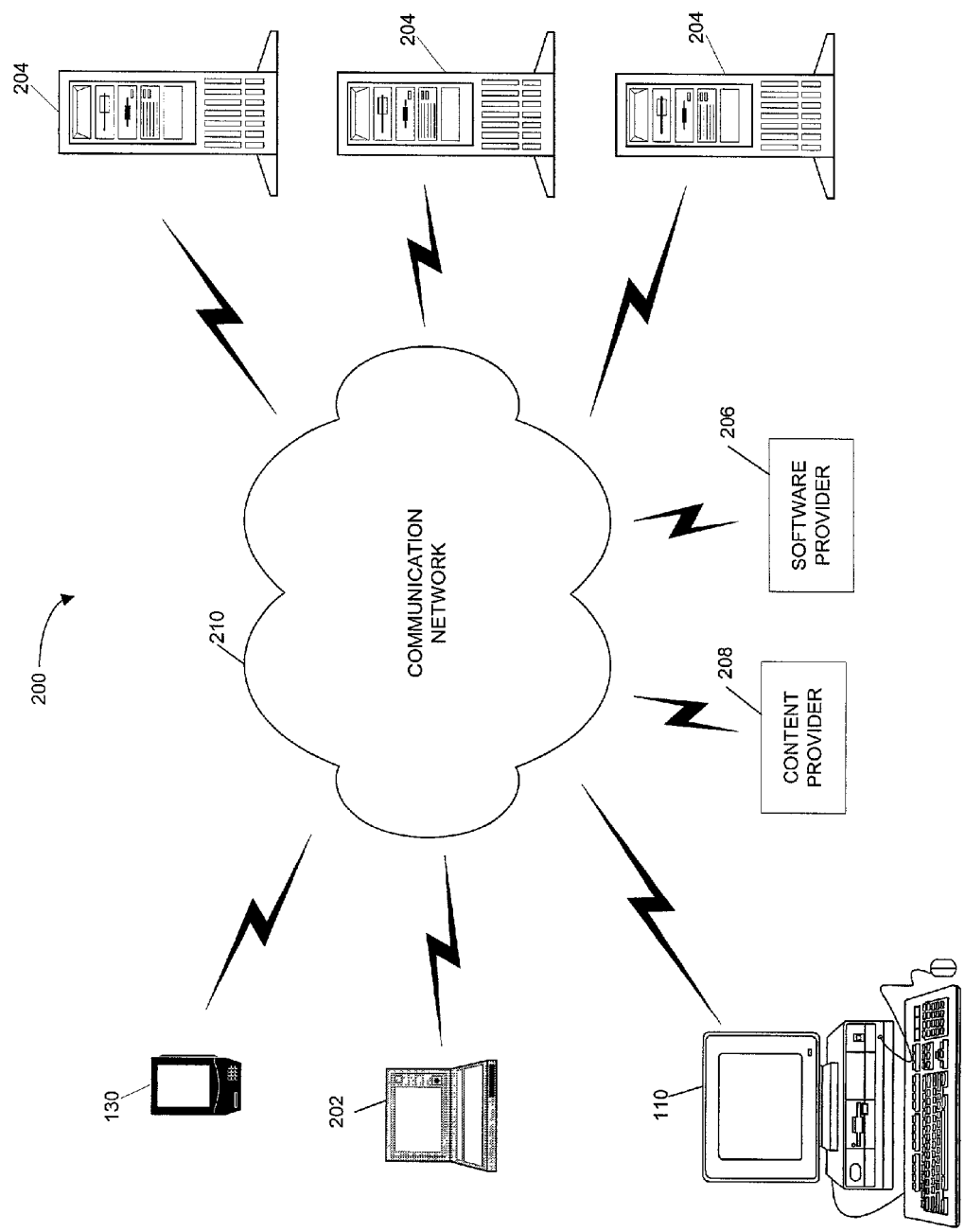
FIG. 7 is a block diagram of system components for an embodiment of an apparatus usable with the methods of FIGS. 1 and 4–6.

Now referring to FIG. 7, an apparatus or system 200 usable with the methods disclosed herein is illustrated. The apparatus 200 includes one or more user, recipient or client devices 202 (including the devices 110 and 130) that may communicate directly or indirectly with one or more servers, controllers or other devices 204, one or more software provider devices 206, one or more content provider devices 208, etc. via a computer, data, or communications network 210. The software provide device 206 and/or the content provider device 208 may be a server and/or a user device. A content provider may use a content provider device 208 to send and receive content, information regarding content, etc. A software provider may use a software provider device 206 to send and receive software, information regarding software, etc.

A server 204 may implement or host a Web site. A server 204 can comprise a single device or computer, a networked set or group of devices or computers, a workstation, etc. In some embodiments, a server 204 also may function as a database server and/or as a user device. The use, configuration and operation of servers will be discussed in more detail below.

The user or client devices 202 preferably allow recipients or other users to interact with the server 204 and the remainder of the apparatus 200, receive content, receive and/or provide notifications and other communications, etc. The user devices 202 also may enable a user to access Web sites, software, databases, etc. hosted or operated by the servers 204. If desired, the user devices 202 also may be connected to or otherwise in communication with other devices. Possible user devices include a personal computer, portable computer, mobile or fixed user station, workstation, network terminal or server, cellular telephone, kiosk, dumb terminal, personal digital assistant, etc. In some embodiments, information regarding one or more users and/or one or more user devices may be stored in, or accessed from, a user information database and/or a user device information database.

Many different types of implementations or hardware configurations can be used in the system 200 and with the methods disclosed herein and the methods disclosed herein are not limited to any specific hardware configuration for the system 200 or any of its components.

The communications network 210 might be or include the Internet, the World Wide Web, or some other public or private computer, cable, telephone, client/server, peer-to-peer, or communications network or intranet, as will be described in further detail below. The communications network 210 illustrated in FIG. 7 is meant only to be generally representative of cable, computer, telephone or other communication networks for purposes of elaboration and explanation of the present invention and other devices, networks, etc. may be connected to the communications network 210 without departing from the scope of the present invention. The communications network 210 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 204 without departing from the scope of the present invention. Moreover, as used herein, communications include those enabled by wired or wireless technology.

In some embodiments, a suitable wireless communication network 210 may include the use of Bluetooth technology, allowing a wide range of computing and telecommunication devices to be interconnected via wireless connections. Specifications and other information regarding Bluetooth technology are available at the Bluetooth Internet site www.bluetooth.com. In embodiments utilizing Bluetooth technology, some or all of the devices of FIG. 7 may be equipped with a microchip transceiver that transmits and receives in a previously unused frequency band of 2.45 GHz that is available globally (with some variation of bandwidth in different countries). Connections can be point-to-point or multipoint over a current maximum range of ten (10) meters. Embodiments using Bluetooth technology may require the additional use of one or more receiving stations to receive and forward data from individual user devices 202 or servers 204.

Any number and types of devices may be included in the system 200. The devices shown in FIG. 7 need not be in constant communication. For example, a user device may communicate with a server only when such communication is appropriate or necessary.

Server

Figure 8:
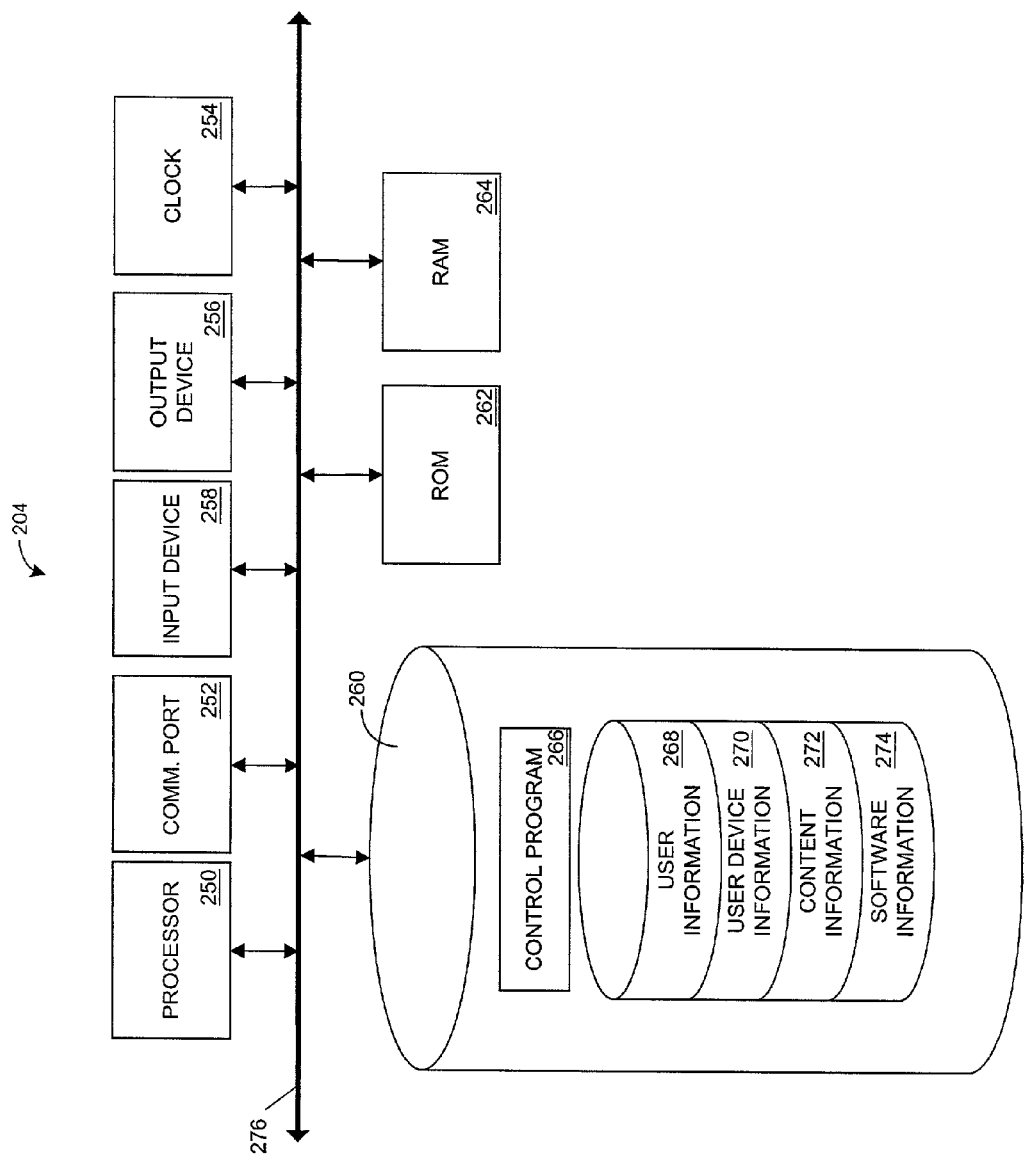
FIG. 8 is a block diagram of components of one embodiment of a server of FIG. 7.

Now referring to FIG. 8, a representative block diagram of a server or controller 204 is illustrated. The server 204 may include a processor, microchip, central processing unit, or computer 250 that is in communication with or otherwise uses or includes one or more communication ports 252 for communicating with user devices and/or other devices. Communication ports may include such things as local area network adapters, wireless communication devices, Bluetooth technology, etc. The server 204 also may include an internal clock element 254 to maintain an accurate time and date for the server 204, create time stamps for communications and/or content received or sent by the server 204, etc.

If desired, the server 204 may include one or more output devices 256 such as a printer, infrared or other transmitter, antenna, audio speaker, display screen or monitor, text to speech converter, etc., as well as one or more input devices 258 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the server 204 may include a memory or data storage device 260 to store information, software, databases, communications, device drivers, content, etc. The memory or data storage device 260 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The server 204 also may include separate ROM 262 and RAM 264.

The processor 250 and the data storage device 260 in the server 204 each may be, for example: (i) located entirely within a single computer or other computing device; or (ii) connected to each other by a remote communication medium, such as a serial port cable, telephone line or radio frequency transceiver. In one embodiment, the server 204 may comprise one or more computers that are connected to a remote server computer for maintaining databases.

A conventional personal computer or workstation with sufficient memory and processing capability may be used as the server 204. In one embodiment, the server 204 operates as or includes a Web server for an Internet environment. The server 204 preferably is capable of high volume transaction processing, performing a significant number of mathematical calculations in processing communications and database searches. A Pentium™ microprocessor such as the Pentium III™ microprocessor, manufactured by Intel Corporation may be used for the processor 250. Equivalent processors are available from Motorola, Inc., AMD, or Sun Microsystems, Inc. The processor 250 also may comprise one or more microprocessors, computers, computer systems, etc.

Software may be resident and operating or operational on the server 204. The software may be stored on the data storage device 260 and may include a control program 266 for operating the server, databases, etc. The control program 266 may control the processor 250. The processor 250 preferably performs instructions of the control program 266, and thereby operates in accordance with the present invention, and particularly in accordance with the methods described in detail herein. The control program 266 may be stored in a compressed, uncompiled and/or encrypted format. The control program 266 furthermore includes program elements that may be necessary, such as an operating system, a database management system and device drivers for allowing the processor 250 to interface with peripheral devices, databases, etc. Appropriate program elements are known to those skilled in the art, and need not be described in detail herein.

The server 204 also may include or store information regarding users, communications, content segments, software, etc. For example, information regarding one or more users may be stored in a user information database 268 for use by the server 204 or another device or entity. Information regarding one or more user devices may be stored in a user device information database 270 for use by the server 204 or another device or entity. Information regarding content may be stored in a content information database 272 for use by the server 204 or another device or entity. Information regarding software may be stored in a software information database 274 for use by the server 204 or another device or entity.

According to an embodiment of the present invention, the instructions of the control program may be read into a main memory from another computer-readable medium, such as from the ROM 262 to the RAM 264. Execution of sequences of the instructions in the control program causes the processor 250 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 250, communication port 252, clock 254, output device 256, input device 258, data storage device 260, ROM 262, and RAM 264 may communicate or be connected directly or indirectly in a variety of ways. For example, the processor 250, communication port 252, clock 254, output device 256, input device 258, data storage device 260, ROM 262, and RAM 264 may be connected via a bus 276.

While specific implementations and hardware configurations for servers 204 have been illustrated, it should be noted that other implementations and hardware configurations are possible and that no specific implementation or hardware configuration is needed. Thus, not all of the components illustrated in FIG. 8 may be needed for a server implementing the methods disclosed herein. Therefore, many different types of implementations or hardware configurations can be used in the system 200 and the methods disclosed herein are not limited to any specific hardware configuration.

User Device

As mentioned above, a user or recipient device 202 may be or include any of a number of different types of devices, including, but not limited to, a personal computer, portable computer, mobile or fixed user station, workstation, network terminal or server, telephone, beeper, kiosk, dumb terminal, personal digital assistant, facsimile machine, two-way pager, radio, cable set-top box, etc. If desired, the user device 202 also may function as a server 204 and/or content server. In some embodiments, a user device 202 may have the same structure or configuration as the server 204 illustrated in FIG. 8 and include some or all of the components of the server 204.

Databases

As previously discussed above, in some embodiments a server, user device, or other device may include or access a user information database for storing or keeping information regarding one or more users. One representative user information database 300 is illustrated in FIG. 9.

The user information database 300 may include a user identifier field 302 that may include codes or other identifiers for one or more users, a user name field 304 that may includes names, descriptions, contact information, personal information, etc. for the users identified in the field 302, a user device identifier field 306 that may include codes or other identifiers for user devices associated with the users identified in the field 306, and a software identifier field 308 that may include codes or other identifiers for software products, programs, etc. that that are used, controlled or operated by the users identified in the field 302 or otherwise associated with the users identified in the field 302 or the user devices identified in the field 306. Other or different fields also may be used in the user information database 300. For example, the user information database 300 may include information regarding one or more software programs associated with the users identified in the field 302 and/or the user devices identified in the field 304. A user may be associated with one or more user devices, one or more software programs, and/or one or more content segments.

Figure 9:
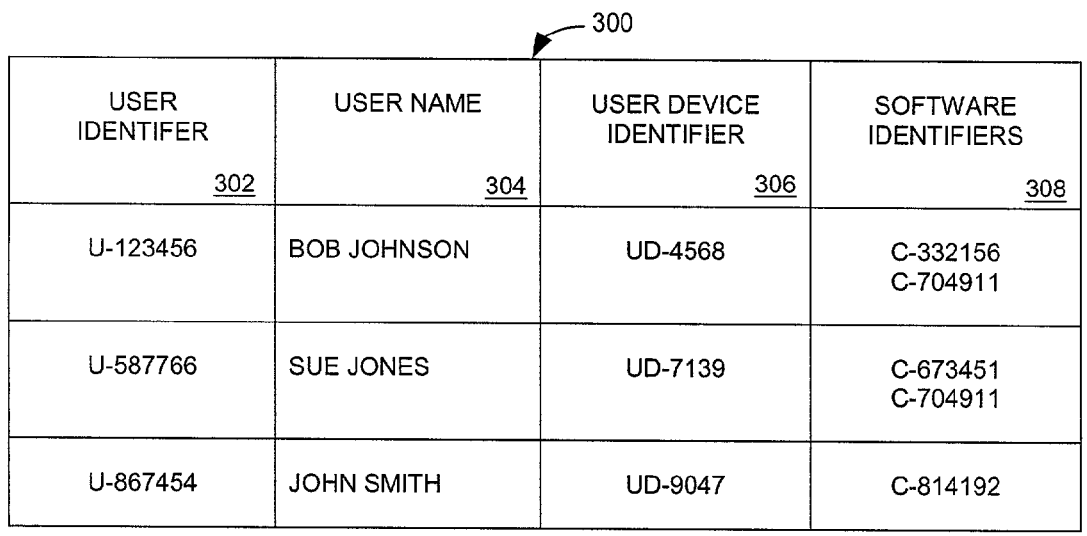
FIG. 9 is an illustration of one potential implementation of the user information database of FIG. 8.

As illustrated by the user information database 300 of FIG. 9, the user identified as "U-123456" in the field 302 is named "BOB JOHNSON" and is associated with the user device identified as "UD-4568" and the content identified as "C-332156" and "C-704911". The user identified as "U-123456" may own or use the user device "UD-4568." The content identified as "C-332156" and "C-704911" may be stored on the user device "UD-4568" or operated with the user device "UD-4568." Information regarding the user device "US-4568" may be found in a user device information database while information regarding the content "C-332156" and/or "C-704911" may be found in a content information database.

Figure 10:
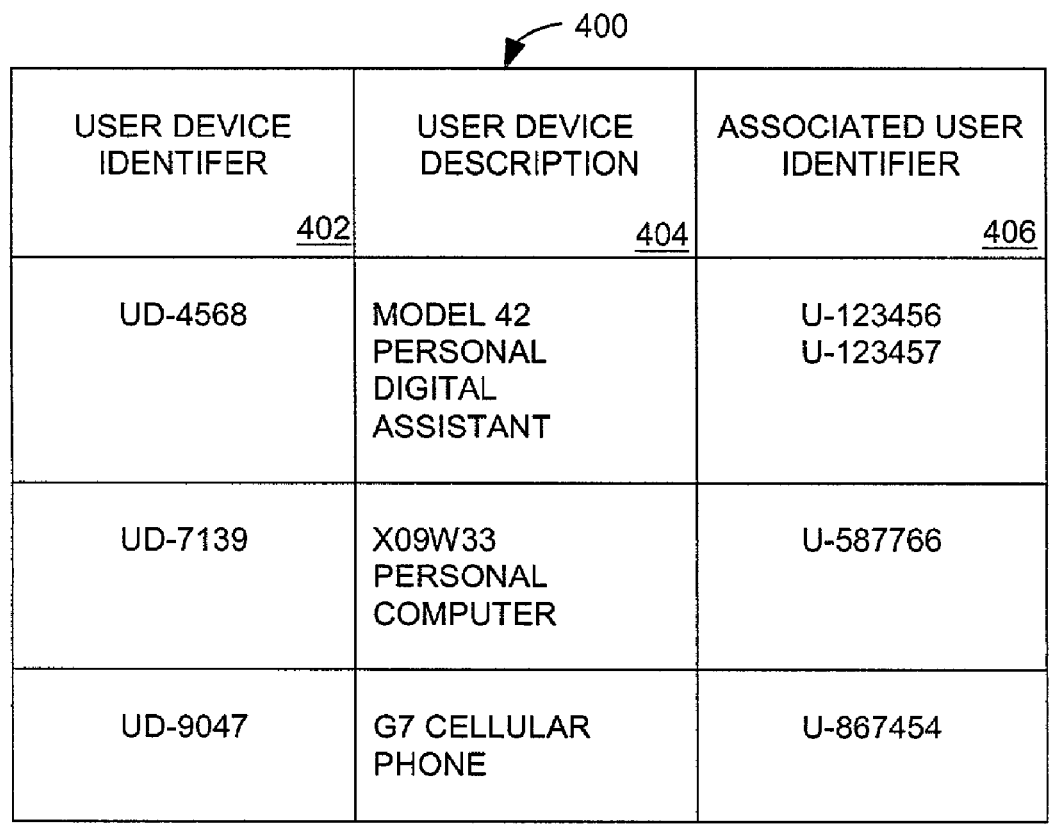
FIG. 10 is an illustration of one potential implementation of the user device information database of FIG. 8.

As previously discussed above, in some embodiments a server, user device, or other device may include or access a user device information database for storing or keeping information regarding one or more user devices. One representative user device information database 400 is illustrated in FIG. 10.

The user device information database 400 may include a user device identifier field 402 that may include codes or other identifiers for one or more user devices, a user device description field 404 that may include names, descriptions, operating or performance specifications, etc. for the user devices identified in the field 402, and an associated user identifier field 406 that may include codes or other identifiers for one or more users associated with the user devices identified in the field 402. Other or different fields also may be used in the user device information database 400. For example, the user device information database 400 may include additional fields that include information regarding the capabilities of the device, availability of the device, etc. As illustrated by the user device information database 400 of FIG. 10, the user device identified as "UD-4568" in the field 402 is a "MODEL 42 PERSONAL DIGITAL ASSISTANT" as is used by or otherwise associated with the two users identified as "U-123456" and "U-123457."

As previously discussed above, in some embodiments a server, user device, or other device may include or access a content information database for storing or keeping information regarding content and/or one or more content segments. One representative content information database 500 is illustrated in FIG. 11.

The content information database 500 may include a content identifier field 502 that may include codes or other identifiers for one or more portions of content or content segments, a content description field 504 that may include names, descriptions and/or other information regarding the content identified in the field 502, a content number field 506 that may include information regarding the number of content segments included in or available with the content identified in the field 502, a display information field 502 that may include rules, algorithms and/or other information regarding how, how long, when, and under what circumstances the content identified in the field 502 can or is to be displayed by a device, and an associated software identifier field 510 that may include codes or other identifiers for software programs that may be associated with the content identified in the field 502. Other or different fields also may be used in the content information database 500. For example, the content information database 500 may include fields that contain more detailed information regarding the structure or content of each content segment associated with content identified in the field 502. As another example, the content information database 500 may include more detailed information regarding how a software program is associated with a particular item of content.

Figure 11:
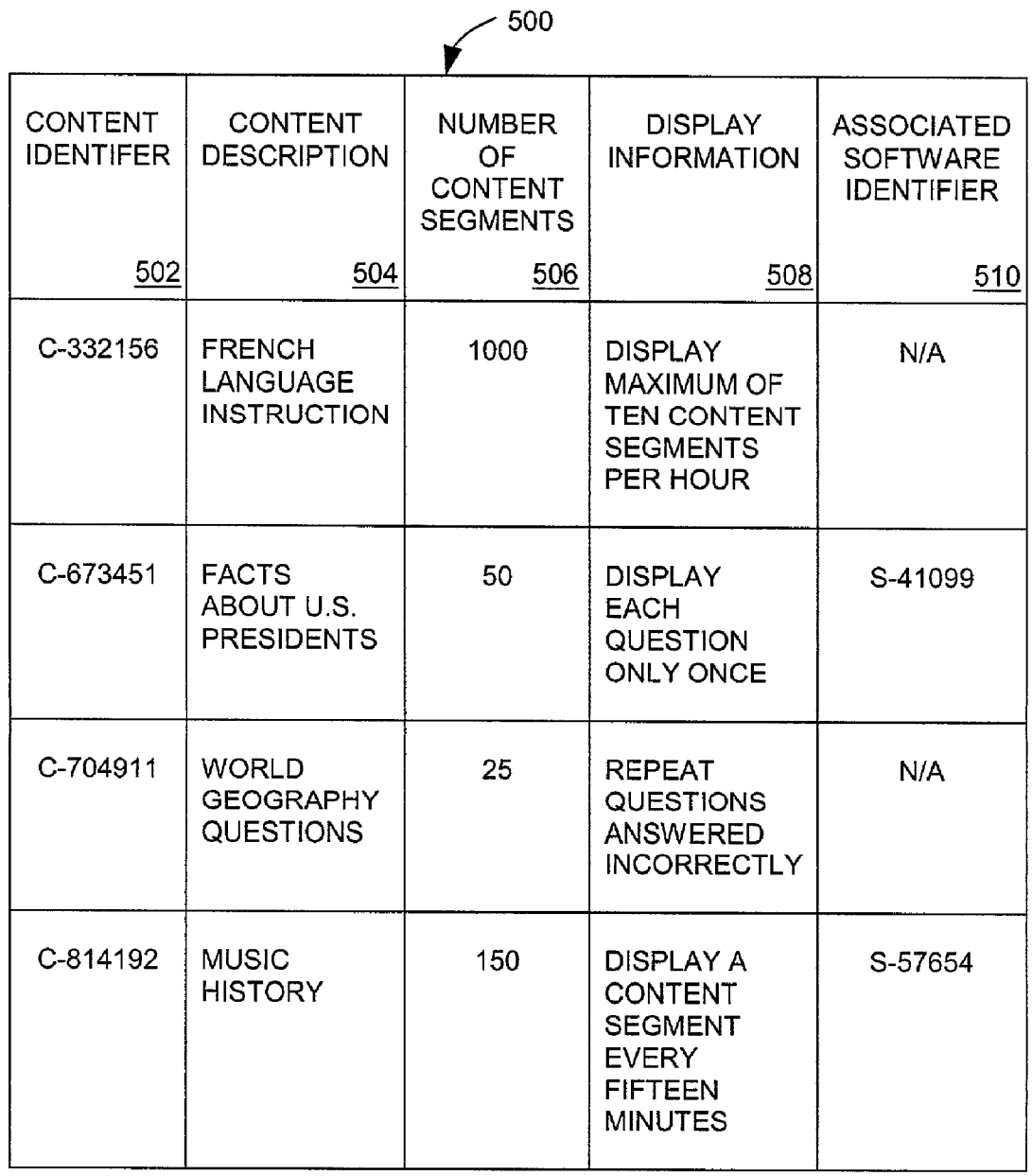
FIG. 11 is an illustration of one potential implementation of the content information database of FIG. 8.

As illustrated in the content information database 500 of FIG. 11, the content identified as "C-332156" in the field 502 is described as "FRENCH LANGUAGE INSTRUCTION" and includes or is associated with one thousand content segments. When the content identified as "C-332156" is used with a device, preferably a maximum ten content segments are displayed per hour by the device. The content identified as "C-332156" is not associated with any specific software program.

Also as illustrated in the content information database 500 of FIG. 11, the content identified as "C-673451" in the field 502 is described as "FACTS ABOUT U.S. PRESIDENTS" and includes or is associated with fifty content segments. When the content identified as "C-673451" is used with a device, preferably each content segment is displayed only once by the device. The content identified as "C-673451" is associated with a software program identified as "S-41099". Thus, presumably the content identified as "C-673451" is displayed by a device when the software identified as "S-41099" is operated on the device. Information regarding the software identified as "S-41099" may be found in a software information database As previously discussed above, in some embodiments a server, user device, or other device may include or access a software information database for storing or keeping information regarding one or more software programs. One representative software information database 700 is illustrated in FIG. 12.

The software information database 700 may include a software identifier field 702 that may include codes or other identifiers for one or more software programs, a software description field 704 that may include a name, description, operational or technical details, or other information for the software identified in the field 702, and a software provider field 706 that may include names, codes, or other identifiers for one or more suppliers, manufacturers, sellers, etc. of the software identified in the field 702. Other or different fields also may be used in the software information database 700. As illustrated by the software information database 700 of FIG. 12, the software identified as "S-22654" in the field 702 is a "SPREADSHEET PROGRAM" and is provided by "SPREADSHEETS ARE US SOFTWARE."

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. For example, the methods disclosed herein may use two or more thematically related content segments that are stored locally or remotely to each other or a device displaying one or more of them.

Many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to a preferred embodiment thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The invention claimed is:

1. A method for providing content, comprising:
   determining a plurality of content segments;
   determining a device associated with a recipient of said plurality of content segments;
   providing a first of said plurality of content segments to said device at a first time and a second of said plurality of content segments to said device at a second time, wherein display of a content segment by said device interrupts operation of said device, said first of said plurality of content segments for posing a question to said recipient;
   receiving a response to said question from said recipient; and
   determining if said response to said question is correct.

2. The method of claim 1, wherein said determining a plurality of content segments includes at least one of the following:
   selecting said plurality of content segments;
   determining bandwidth of a communication channel to said device;
   selecting said plurality of content segments based, at least in part, on available bandwidth of a communication channel to said device;
   determining at least one time window of opportunity to provide said first of said plurality of content segments to said device;
   selecting said first of said plurality of content segments based, at least in part, on availability of said device;
   selecting said first of said plurality of content segments based, at least in part, on availability of a communication channel to said device;
   selecting said first of said plurality of content segments based, at least in part, on demographic information regarding said recipient; and
   selecting said first of said plurality of content segments based, at least in part, on an attribute of said device; and
   selecting said first of said plurality of content segments based, at least in part, on an attribute of said recipient.

3. The method of claim 1, wherein said determining a plurality of content segments includes at least one of the following:
   receiving a notification regarding said plurality of content segments;
   receiving a request from said recipient to provide all of said plurality of content segments;
   receiving a request from said device to provide all of said plurality of content segments;
   receiving a request from said recipient to provide said first of said plurality of content segments; and
   receiving a request from said device to provide said first of said plurality of content segments.

4. The method of claim 1, further comprising:
   identifying said recipient.

5. The method of claim 4, wherein said identifying said recipient includes at least one of the following:
   selecting said recipient from a group of potential recipients;
   identifying said recipient from data included in a request to provide said plurality of content segments; and
   identifying said recipient based, at least in part, on an attribute of said recipient.

6. The method of claim 1, wherein said determining a device associated with a recipient includes at least one of the following:
   determining an address for said device;
   determining a communication channel to said device;
   determining accessibility of said device;
   receiving a notification regarding said device from said recipient;
   receiving a request to provide said first and second of said plurality of content segments to a specific device;
   receiving a command from said recipient to provide said first and second of said plurality of content segments to a specific device; and
   selecting said device from a plurality of devices associated with said recipient.

7. The method of claim 1, further comprising:
   determining said first time and said second time.

8. The method of claim 7, wherein said determining said first time and said second time includes at least one of the following:
   determining a time interval associated with said first and second of said plurality of content segments, wherein said second time occurs said time interval after said first time;
   determining a time interval associated with said plurality of content segments, wherein said second time occurs at least said time interval after said first time;
   determining a time interval associated with said recipient, wherein said second time occurs at least said time interval after said first time;
   determining a time interval associated with said device, wherein said second time occurs at least said time interval after said first time;
   determining a time interval associated with said plurality of content segments, wherein said first time occurs at least said time interval after receipt of a request to provide said plurality of content segments; and
   determining a time interval associated with said plurality of content segments, wherein said first time occurs at least said time interval after receipt of a request to provide said content segments and said second time occurs at least said time interval after said first time.

9. The method of claim 7, wherein said determining said first time and said second time includes at least one of the following:
   receiving a notification regarding said first time from said recipient;
   receiving a notification regarding said first time from said device;
   determining accessibility of said device;
   determining an attribute of said recipient;
   determining an attribute of said device;
   selecting said first time at random;
   selecting said first time to be during a period of accessibility of said device;
   selecting said first time based, at least in part, on an external event;
   selecting said first time based, at least in part, on an attribute of said recipient;
   selecting said first time based, at least in part, on an attribute of said device; and
   selecting said second time based, at least in part, on a length of time between said first time and a time at which a response to said first of said plurality of content segments is received.

10. The method of claim 7, wherein said determining said first time and said second time includes at least one of the following:
- determining said first time based, at least in part, on a number of content segments in said plurality of content segments;
- determining said first time based, at least in part, on a length of time available to display said plurality of content segments;
- determining said first time based, at least in part, on a minimum length of time to be used to display all of said plurality of content segments;
- determining said first time based, at least in part, on a maximum length of time to be used to display all of said plurality of content segments;
- determining said first time based, at least in part, on a format of said first of said plurality of content segments; and
- determining said second time based, at least in part, on a response provided to said first of said plurality of content segments.

11. The method of claim 1, wherein said providing said first of said plurality of content segments to said device at a first time and said second of said plurality of content segments to said device at a second time includes at least one of the following:
- providing said both said first and said second of said plurality of content segments to said device prior to said first time and allowing said device to display said first of said plurality of content segments at said first time and said second of said plurality of content segments at said second time; and
- providing said both said first and said second of said plurality of content segments to said device at said first time and allowing said device to display said first of said plurality of content segments at said first time and said second of said plurality of content segments at said second time.

12. The method of claim 1, wherein said providing said first of said plurality of content segments to said device at a first time and said second of said plurality of content segments to said device at a second time includes at least one of the following:
- providing to said device at said first time data indicative of a location of said first of said plurality of content segments;
- providing to said device at said second time data indicative of a location of said second of said plurality of content segments;
- providing to said device data indicative of a location of said first of said plurality of content segments and data indicative of a location of said second of said plurality of content segments and allowing said device to retrieve said first of said plurality of content segments at said first time and said second of said plurality of content segments at said second time;
- providing to said device data indicative of a location of said first of said plurality of content segments and data indicative of a location of said second of said plurality of content segments and allowing said device to retrieve said first of said plurality of content segments prior to said first time and said second of said plurality of content segments prior to said second time; and
- providing to said device data indicative of a location of said first of said plurality of content segments and data indicative of a location of said second of said plurality of content segments, allowing said device to retrieve said first of said plurality of content segments prior to said first time and said second of said plurality of content segments prior to said second time, and allowing said device to display said first of said plurality of content segments at said first time and said second of said plurality of content segments at said second time.

13. The method of claim 1, wherein said providing said first of said plurality of content segments to said recipient at a first time and said second of said plurality of content segments to said recipient at a second time includes at least one of the following:
- interrupting display of a content segment by said device by displaying said first of said plurality of content segments on said device;
- interrupting operation of said device and displaying said first of said plurality of content segments on said device; and
- interrupting operation of software on said device and displaying said first of said plurality of content segments on said device.

14. The method of claim 1, wherein at least one of said plurality of content segments includes at least one of the following:
- educational content;
- an advertisement;
- a survey;
- a question;
- an animation;
- a sound file;
- a video clip;
- a multimedia file;
- an image;
- software code;
- text material; and
- rich media.

15. The method of claim 1, further comprising at least one of the following:
- allowing said recipient to select at least one of said plurality of content segments; and
- allowing said recipient to select all of said plurality of content segments.

16. The method of claim 1, further comprising at least one of the following:
- receiving a notification regarding a selection of at least one of said plurality of content segments;
- receiving a notification regarding accessibility of said device;
- receiving a notification regarding a communication channel to said device;
- selecting said first of said plurality of content segments based, at least in part, on an attribute of said device; and
- selecting said first of said plurality of content segments based, at least in part, on an attribute of said recipient.

17. The method of claim 1, wherein said determining a plurality of content segments includes identifying said plurality of content segments after receiving a request to provide said plurality of content segments.

18. The method of claim 17, wherein said identifying said plurality of content segments includes at least one of the following:
- selecting said plurality of content segments based, at least in part, on said recipient;
- selecting said plurality of content segments based, at least in part, on said device; and
- selecting said plurality of content segments based, at least in part, on said request.

19. The method of claim 17, wherein said request includes at least one of the following:
information regarding a communication channel for delivery of said plurality of content segments;
information regarding a format for said plurality of content segments;
information regarding said recipient;
information regarding said device;
an identifier associated with said plurality of content segments;
an identifier associated with said device; and
an identifier associated with said recipient.

20. The method of claim 1, wherein said first and second of said plurality of content segments are stored on said device.

21. The method of claim 1, wherein an interruption of said operation of said device includes at least one of the following:
an interruption in display of material by said device;
an interruption in display of material by software operating on said device;
a delay in use of data by software operating on said device;
a delay in use of data by said device;
a delay in manipulation of data by software operating on said device;
a delay in manipulation of data by said device;
a display of a window by said device;
a display of a window by software operating on said device;
a display of an image by said device;
a change in display of material by said device from foreground to background;
a change in display of material by said device from background to foreground;
a change in display of material by software operating on said device from foreground to background;
a change in display of material by software operating on said device from background to foreground;
a delay in operation of a software program operating on said device while a content segment is displayed by said device;
a delay in visual display of data by said device;
a delay in transmission of data by said device;
a delay in storage of data by said device;
a delay in reception of data by said device;
a delay in transmission of data by software operating on said device;
a delay in storage of data by software operating on said device;
a delay in reception of data by software operating on said device;
a prevention of use of at least one feature of said device while a content segment is displayed by said device;
a prevention of use of at least one feature of software operating on said device while a content segment is displayed by said device;
a suspension of usability of said device while a content segment is displayed by said device; and
a suspension of usability of software operating on said device while a content segment is displayed by said device.

22. The method of claim 1, further comprising:
evaluating a response to said first of said plurality of content segments.

23. The method of claim 1, further comprising:
evaluating responses to all of said plurality of content segments.

24. The method of claim 1, further comprising:
determining a format for said first of said plurality of content segments.

25. The method of claim 1, wherein all of said plurality of content segments are thematically related.

26. The method of claim 1, further comprising:
identifying a time period during which said plurality of content segments are to be displayed by said device.

27. The method of claim 26, wherein said first time and said second time occur within said time period.

28. The method of claim 26, further comprising:
determining a first time associated with a first of said plurality of content segments and a second time associated with a second of said plurality of content segments by randomly selecting said first time and said second time from said time period.

29. The method of claim 1, wherein selection of said second of said plurality of content segments is based, at least in part, on whether said recipient's response to said first of said plurality of content segments is correct.

30. The method of claim 1, further comprising:
determining a duration of time that said first of said plurality of content segments is to be displayed by said device.

31. The method of claim 1, further comprising:
determining a rule governing display of said first of said plurality of content segments by said device.

32. The method of claim 1, further comprising:
determining a benefit associated with viewing of said first of said plurality of content segments;
wherein said benefit includes at least one of a rebate, a discount and a coupon.

33. The method of claim 1, further comprising:
providing a notification of said benefit.

34. A method for providing content, comprising:
determining a plurality of content segments;
identifying a first device associated with a recipient of said plurality of content segments and a second device associated with said recipient;
allowing said first device to display a first of said plurality of content segments, said first of said plurality of content segments for posing a question to a user of said device;
receiving a response to said question from said recipient;
determining if said response to said question is correct; and
allowing said second device to display a second of said plurality of content segments.

35. The method of claim 34, further comprising:
providing said first of said plurality of content segments to said first device and said second of said plurality of content segments to said second device.

36. The method of claim 34, further comprising:
providing data indicative of a location of said first of said plurality of content segments to said first device and data indicative of a location of said second of said plurality of content segments to said second device.

37. The method of claim 34, wherein display of said first content segment by said first device interrupts operation of said first device.

38. The method of claim 34, wherein display of said second content segment by said second device interrupts operation of said second device.

39. A method for providing content, comprising:
   determining a plurality of content segments;
   determining a device associated with a recipient of said plurality of content segments;
   providing at least two of said plurality of content segments to said device; allowing said device to display a first of said plurality of content segments at a first time and a second of said plurality of content segments at a second time, wherein display of a content segment by said device interrupts operation of said device, said first of said plurality of content segments for posing a question to said recipient;
   receiving a response to said question from said recipient; and
   determining if said response to said question is correct.

40. The method of claim 39, wherein said first and second of said plurality of content segments are stored on said device.

41. A system for facilitating display of at least one content segment, comprising:
   a memory;
   a communication port; and
   a processor connected to said memory and said communication port, said processor being operative to:
      determine a plurality of content segments;
      determine a device associated with a recipient of said plurality of content segments;
      provide a first of said plurality of content segments to said device at a first time and a second of said plurality of content segments to said device at a second time, wherein display of a content segment by said device interrupts operation of said device, said first of said plurality of content segments for posing a question to said recipient;
      receive a response to said question from said recipient; and
      determine if said response to said question is correct.

42. A computer program product in a computer readable medium for facilitating display of at least one content segment, comprising:
   first instructions for identifying determining a first content segment and a second content segment;
   second instructions for identifying at least one device associated with a recipient of said first and second content segments;
   third instructions for sending said first content segment to said device at a first time and said second content segment to said device at a second time, wherein display of a content segment by said device interrupts operation of said device, said first of said plurality of content segments for posing a question to said recipient;
   fourth instructions for receiving a response to said question from said recipient; and
   fifth instructions for determining if said response to said question is correct.

* * * * *